(12) United States Patent
Schileru

(10) Patent No.: US 8,531,483 B1
(45) Date of Patent: *Sep. 10, 2013

(54) METHOD AND SYSTEM FOR PROVIDING VIRTUAL TOUR OF A SHOPPING MALL VIA ELECTRONIC MAPS

(76) Inventor: Rodica Schileru, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/437,059

(22) Filed: Apr. 2, 2012

Related U.S. Application Data

(60) Continuation of application No. 10/427,410, filed on Apr. 30, 2003, which is a continuation-in-part of application No. 10/092,813, filed on Mar. 6, 2002, now Pat. No. 6,580,441, which is a division of application No. 09/287,088, filed on Apr. 6, 1999, now Pat. No. 6,388,688.

(51) Int. Cl.
*G06T 5/00* (2006.01)

(52) U.S. Cl.
USPC ............................ 345/629; 345/635; 701/426

(58) Field of Classification Search
USPC ......... 345/629, 633, 440, 850, 635; 701/426, 701/467–468; 382/104; 715/850
See application file for complete search history.

(56) References Cited

U.S. PATENT DOCUMENTS

| | | | | |
|---|---|---|---|---|
| 5,559,707 A | * | 9/1996 | DeLorme et al. | 701/467 |
| 5,802,492 A | * | 9/1998 | DeLorme et al. | 701/533 |
| 6,321,158 B1 | * | 11/2001 | DeLorme et al. | 701/426 |
| 2003/0009281 A1 | * | 1/2003 | Whitham | 701/211 |
| 2003/0059088 A1 | * | 3/2003 | Culp et al. | 382/104 |
| 2003/0063133 A1 | * | 4/2003 | Foote et al. | 345/850 |
| 2003/0182052 A1 | * | 9/2003 | DeLorme et al. | 701/201 |
| 2011/0010241 A1 | * | 1/2011 | Mays | 701/200 |

* cited by examiner

*Primary Examiner* — Chante Harrison
(74) *Attorney, Agent, or Firm* — Joe Zheng

(57) ABSTRACT

Techniques for navigating a real world via interactive maps are disclosed. According one aspect, at least one or more databases are maintained in one or more servers. A computing device is caused to display a first portion of the interactive map generated from a logic process based on a first database, wherein the first portion of the interactive map represents a first part of a real world (e.g., a shopping mall) and includes one or more nodes, one or more branches, and one or more of hotspots in the real world, each of the hotspots represents a point of interest that is selectable to show details about the point of interest. Auxiliary data associated with the each of the hotspots is accessed when the user selects one of the hotspots, and subsequently displayed to show a visual effect about the hotspot so that the user understands more about the hotspot.

20 Claims, 25 Drawing Sheets

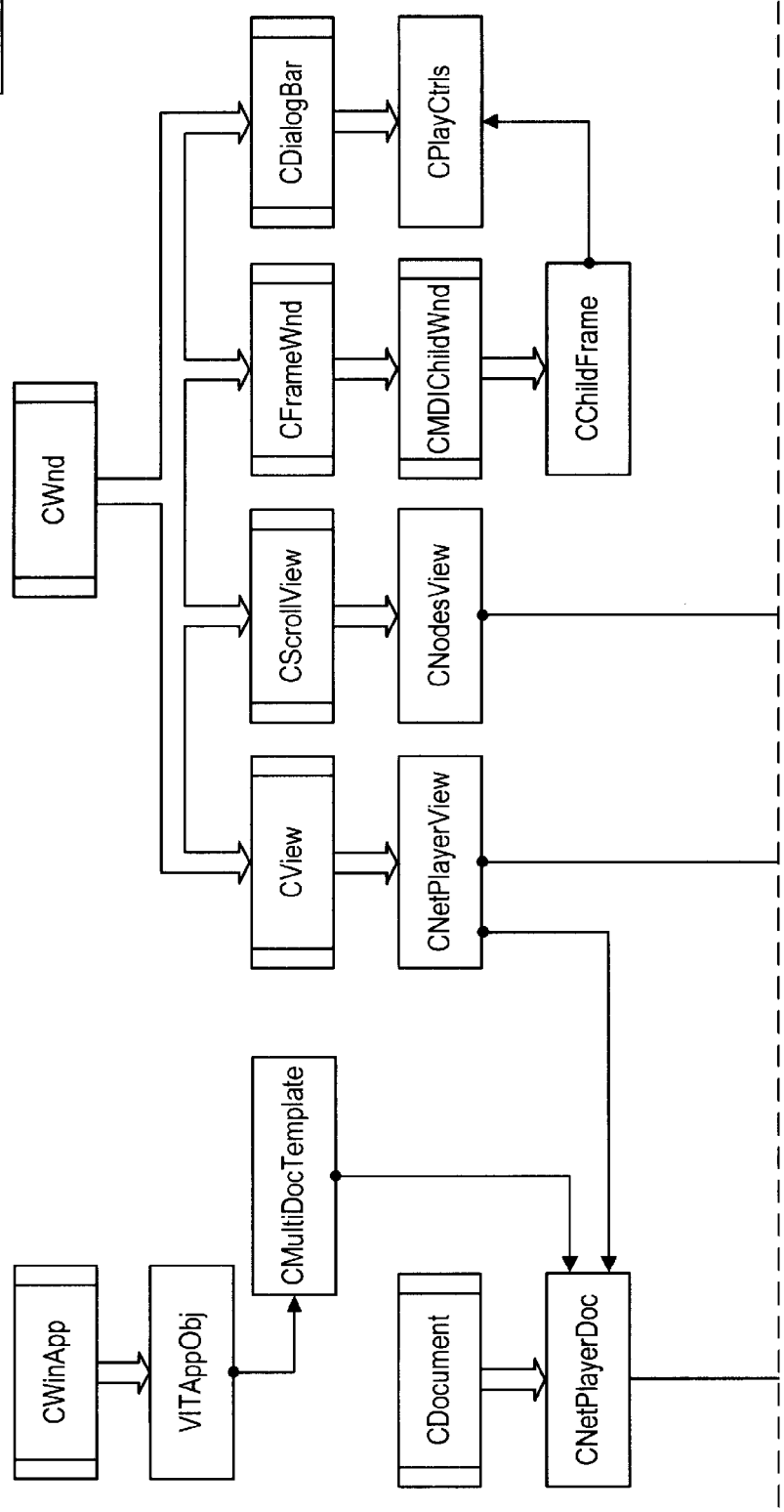

METHOD AND SYSTEM FOR PROVIDING VIRTUAL TOUR OF A SHOPPING MALL VIA ELECTRONIC MAPS

CROSS-REFERENCE TO RELATED APPLICATIONS

This application is a continuation of U.S. application Ser. No. 10/427,410, filed on Apr. 30, 2003, which is a continuation-in-part application of U.S. application Ser. No. 10/092,813, filed on Mar. 6, 2002, now U.S. Pat. No. 6,580,441, which is a divisional application of U.S. application Ser. No. 09/287,088, filed Apr. 6, 1999, now U.S. Pat. No. 6,388,688. This application is also related to U.S. application Ser. No. 10/427,410, U.S. Pat. No. 6,580,441 and U.S. Pat. No. 6,388,688, which are hereby fully incorporated by reference.

CROSS-REFERENCE TO APPENDICES

Microfiche Appendix A, which is part of the present disclosure, is an appendix consisting of two sheets of microfiche containing a total of 132 frames, microfiche Appendix B, which is part of the present disclosure, is an appendix consisting of single sheet containing a total of 44 frames, and microfiche Appendix C, which is part of the present disclosure, consists of a single sheet containing 34 frames of a computer program and related data according to an embodiment of the invention. These listings of the computer program contain material which is subject to copyright protection. The copyright owner has no objection to the facsimile reproduction by anyone of the patent document or the present disclosure, as it appears in the Patent and Trademark Office patent files or records, but otherwise reserves all copyright rights whatsoever.

BACKGROUND OF THE INVENTION

1. Field of the Invention

The present invention relates generally to computer programs and, particularly, to computer systems used to navigate logical processes and virtual environments.

2. Related Art

One method of presenting a virtual tour of a logical process is through a temporal presentation, e.g., through a film or video, or through a series of slides, pictures, or flow diagrams. However, the drawback of such a method is that the ability to jump to different parts of the tour is based on time rather than on steps in the process. In addition, a virtual tour of a logical process that includes a mixture of films, videos, slides, pictures, flow diagrams, etc. may not be amenable to a purely temporal presentation.

Virtual tours of real, physical environments are commonly presented through film or video. While such presentations offer high visual accuracy, the progress of the tours is generally limited to a single, static route chosen by the photographer or editor. In other words, an observer of the tours has none of the choices usually available to someone who is physically in the environment, e.g., choices such as turning one way or the other at an intersection, skipping uninteresting paths, or proceeding directly to a favorite location. The interaction by an observer with the environment is limited to commands such as start, stop, fast forward or reverse. A further limitation of this approach is that the observer generally has no other context besides the image itself. That is, the limited field of view makes it difficult for the observer to orient himself or herself in a complex environment.

For tours in virtual and logical environments, computer systems are commonly used to render images from models representing the virtual and logical environments. As opposed to videotaped presentations, such systems can be highly interactive since the images are rendered in real time. There is, however, a tradeoff between cost and visual accuracy. Computer systems capable of rendering very high-resolution images in real time are prohibitively expensive, while more affordable systems produce inferior quality images. Additionally the creation of rendering computer systems requires highly specialized technical expertise to produce.

SUMMARY OF THE INVENTION

The present invention relates to a computer system that allows interactive navigation and exploration of logical processes. The computer system employs a data architecture comprising a network of nodes connected by branches. Each node in the network represents a decision point in the logical process that allows a user of the computer system to select the next step in the process, and each branch in the network represents a step or a sequence of steps in the logical process.

The network is constructed directly from the target logical process. Navigation data such as image frame sequences, steps in the logical process, and other related information are associated with the elements of the network. This establishes a direct relationship between steps in the process and the data that represents them. From such an organization, the user may tour the process, viewing the image sequences, pictures, diagrams, and/or audio associated with each step and choosing among different steps or paths at will.

In addition to navigating through the environment and process, the user may also access auxiliary information that is related to particular points of interest. This auxiliary information can be of varying forms: video, audio, still images, diagrams, tables, other applications, etc. Such information is linked to a point of interest through the associated network element. By associating this information with the logical environment, the computer system of the present invention is able to provide the observer with additional information on the logical process and related processes.

DETAILED DESCRIPTION OF THE INVENTION

Figure 8:
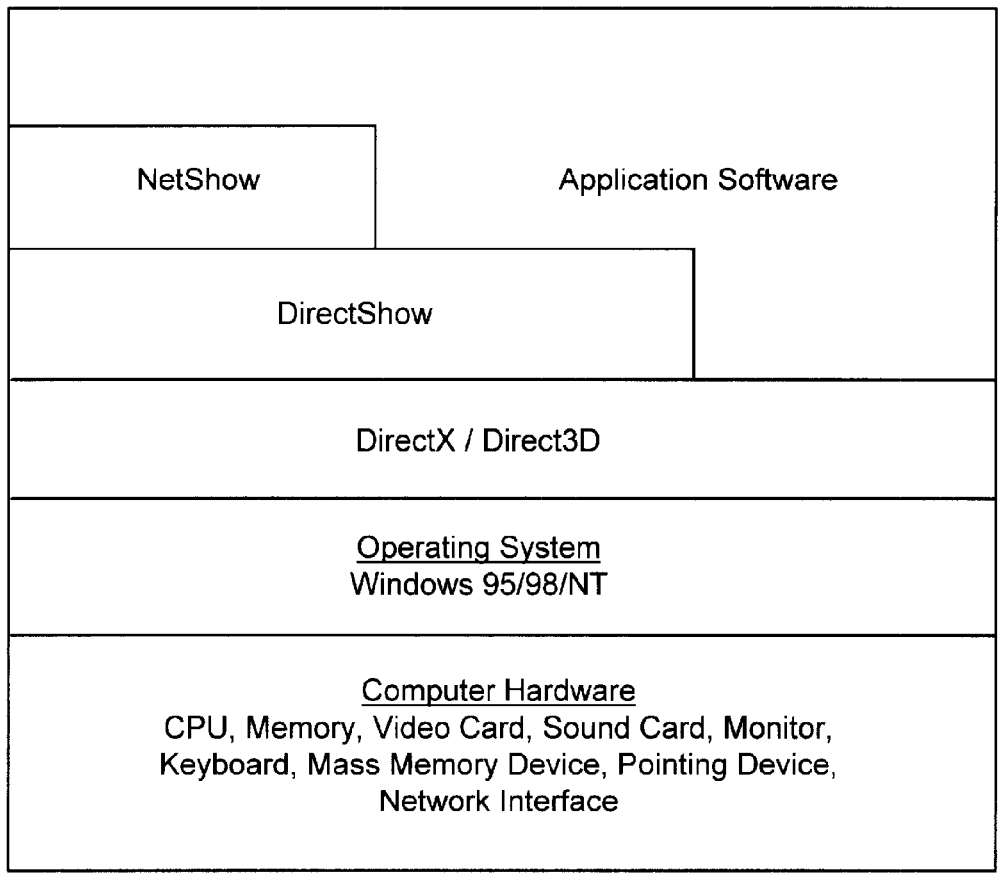
FIG. 8 illustrate the hardware and software structure of a computer system, in accordance to an embodiment of the invention.

As disclosed herein, the present invention includes a method and a computer software system for composing and executing interactive tours of logical processes and spatial environments. FIG. 8 illustrates the hardware and software context of the present invention. The computer hardware specified is a representative of modern multimedia computer systems. Such systems contain a central processing unit (CPU) and memory, a video card to generate images, and a sound card to generate sound. The images are displayed on an electronic computer display monitor. One example of a suitable CPU and memory for the computer system is a 400 Mhz Pentium, Celeron, or other compatible processor with at least 64 MB RAM. The display must be capable of at least 16-bit color.

The computer hardware further includes a keyboard and pointing device for data input. As is understood by those skilled in the art, the pointing device may be a mouse, trackball, joystick, or other similar device. The computer system further includes a mass storage device and/or a network interface. Either a mass storage device or a computer network may be used to store large data such as image files. Suitable mass storage devices will have the characteristics of very large capacity as well as very fast, random access. An example of a suitable mass storage device is a CD-ROM drive. An example of a suitable computer network is the World Wide Web.

The software context described in FIG. 8 includes a computer operating system and several service layers of computer software. Examples of suitable operating systems are Windows 98, Windows 2000, and Windows XP, available from Microsoft Corporation of Redmond, Wash. The present invention requires services provided by three software service applications, NetShow, DirectShow, and DirectX/Direct3D, also available from Microsoft Corporation. As illustrated in FIG. 8, the application software of the present invention has interfaces with each of these three service applications.

Those skilled in the art realize that other hardware and/or software platforms can be used in lieu of the ones described herein in accordance to the principles of the present invention. Accordingly, the invention is not limited to any particular hardware or software platform.

Figure 1:
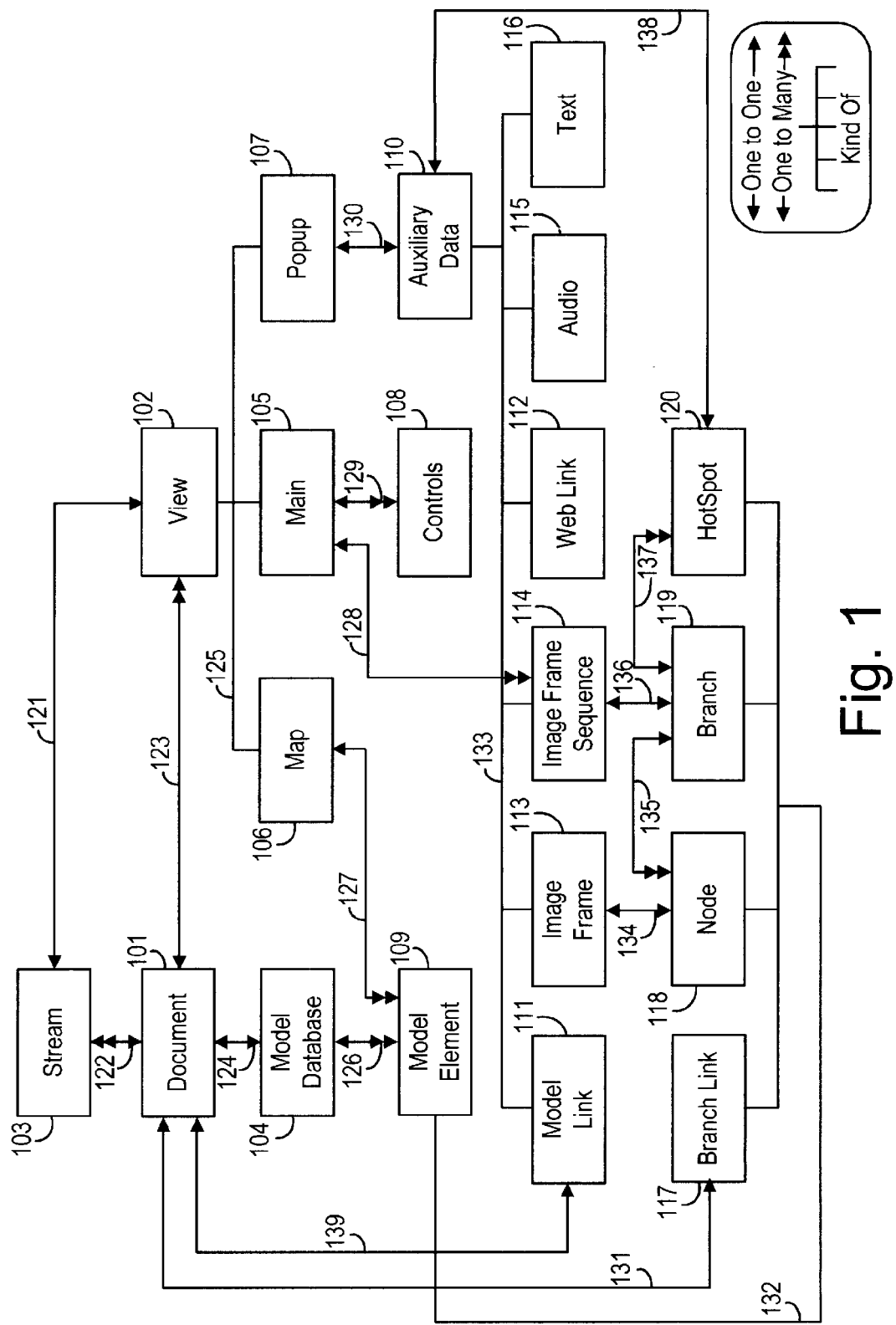
FIG. 1 is a block diagram that illustrates the architecture of the principal design constructs of an embodiment of the present invention.

FIG. 1 illustrates an architecture according to an embodiment of the present invention. Rectangles in the figure identify design constructs, while arrows between rectangles identify relationships between constructs. As illustrated by the legend in the lower right end corner of FIG. 1, arrows with a single head on each end (e.g., arrow 121) indicate a one-to-one relationship between corresponding constructs, while arrows with a single head on one hand and a double head on the other end (e.g., arrow 123) indicate a one-to-many relationship between corresponding constructs.

Documents 101 are the primary construct of the architecture, representing a complete navigational model. Views 102 display some aspect of the document in a window of the computer display. Each view 102 is typically associated with a display window. Relationship 123 indicates that a single document 101 may be displayed using multiple views 102. Relationship 125 indicates that three distinct types of views are used: main views 105, map views 106, and popup views 107. In one embodiment, main view 105 displays image frame sequences, still pictures, text, audio, etc. associated with each path or step on a tour, as illustrated by arrow 128. Main view 105 also contains user controls 109, as illustrated by arrow 129. Map view 106, in turn, displays an interactive map of the environment, including tour paths or steps, decision points or intersections, and points of interest (HotSpots) that allow users of the computer system to access auxiliary information. Popup views 107 display auxiliary data 110 associated with HotSpots, as illustrated by arrow 130.

Each document 101 may manage multiple streams 103, as illustrated by arrow 122. Each stream 103, in turn, provides data to a view 102, as illustrated by arrow 121. The data is contained in one or more stream files, whose names are stored in model database 104. Each document 101 is associated with a single model database 104 that contains the complete data for the document's navigation model, as illustrated by arrow 124. Model database 104 contains multiple model elements 108 that make up the navigation model, as illustrated by arrow 126. Relationship 132 indicates that four kinds of model elements are used. Nodes 118 represent intersections or decision points. Pairs of nodes 118 are connected by branches 119 that represent paths between intersections or steps in a process, as illustrated by arrow 135. A single node 118 may serve as a connecting point for one or more branches 119. HotSpots 120 represent points of interest that enable users to access auxiliary data 110. HotSpots are placed along branches 119, as illustrated by arrow 137. Branch links 117 allow users to transition from one model document to another, as illustrated by arrow 131. Branch links 117 allow traversal between independent navigation models, represented by different documents. Each model element 108 is displayed in a map view 106 as an element of the interactive map, as illustrated by arrow 127.

Relationship 133 indicates that auxiliary data 110 may take several forms. Model links 111 are similar to branch links 117 insofar as they connect documents 101, as illustrated by arrow 139. However, while a branch link jumps unconditionally to a new model, replacing the current model, a model link initiates a new model within the context of the current model. When a new model is terminated, program execution returns to the location of the model link. A web link 112 connects the model to a World Wide Web page. When a web link 112 is executed, the program launches a user's default web browser to access a URL associated with web link 112. In such case, the browser acts as a popup view 107. Auxiliary data 110 displayed in a popup view 107 may also include single images 113, image frame sequences 114, audio clips 115, and text documents 116.

In a further embodiment, auxiliary data 110 could also be a series of events coming from a database or other inputs. For example, in FIG. 23, model 2328 in pool 2304 accesses web services 2326, which in turn can trigger external events, signals, etc. 2320 that could be mapped back into the model. In addition, the models in pool 2304 are also associated with databases 2314-2318. When the display of auxiliary data 110 is terminated, the execution returns to the location of HotSpot 120 in the original model. Users may terminate display of auxiliary data 110 either by closing popup view 107 or by selecting one of the controls in main view 105.

Figure 2:
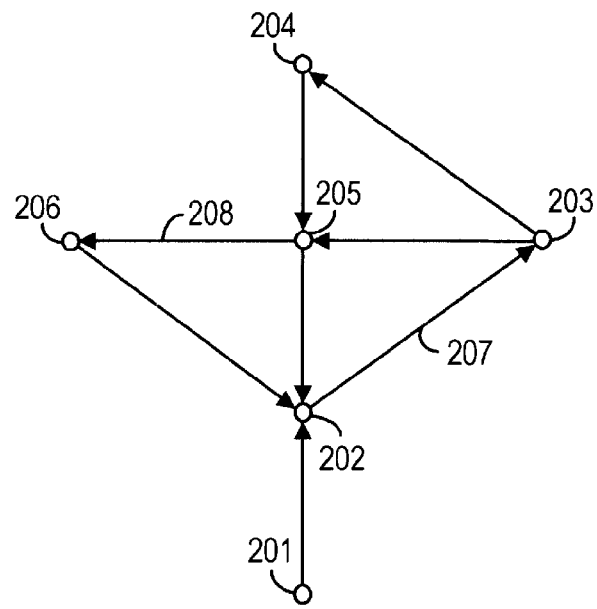
FIG. 2 illustrates an example of the network of nodes and branches that is the underlying representation of the navigation model.

FIG. 2 illustrates a graphical representation of the navigational model, hereafter referred to as "the model." The model is conceptually a network of nodes and connecting branches. The network is represented as a directed, cyclic graph. Each node of the graph represents an endpoint, intersection, or decision point in the model, and each branch represents a path or step in the model. For example, branch 207 connecting nodes 202 and 203, represents a path or step in the model between the intersections or decision points represented by nodes 202 and 203. Furthermore, the orientation of the arrow on branch 207 indicates that the associated path or step is directional, leading from node 202 to node 203.

Figure 3:
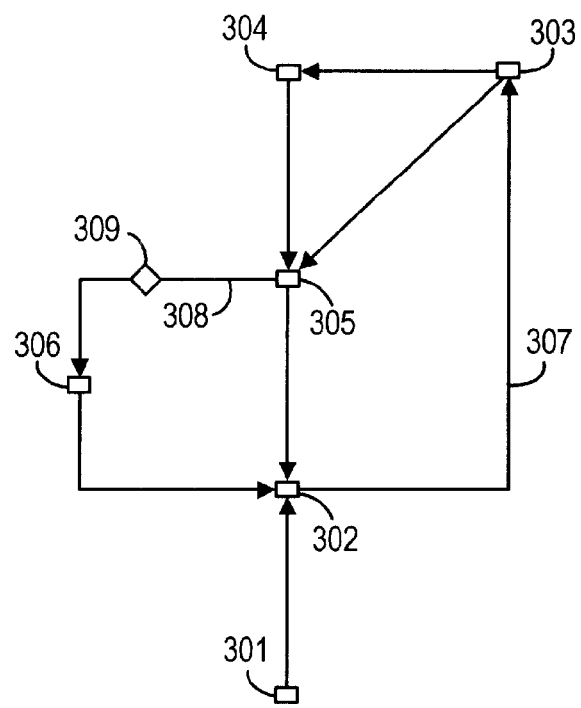
FIG. 3 illustrates one possible map that can be realized from the network shown in FIG. 2.

In one embodiment, the model of FIG. 2 is displayed to the user as a map of the environment, as shown in FIG. 3. Thus, intersections or decision points 301-306 of FIG. 3 correspond to nodes 201-206 of FIG. 2. Paths or steps on the map are not necessarily straight lines (i.e., a path or step may be composed of multiple, connected line segments). Path or step 307, constructed of two segments, corresponds to branch 207. In addition to intersections, decision points, paths, and steps, the map also displays HotSpots located along paths and steps. For example, HotSpot 309 is located along path 308. Since in the model HotSpots are associated with branches, HotSpot 309 is associated with branch 208 that, in turn, corresponds to path or step 308.

Each branch in the model is associated with an image sequence, still picture, diagram, etc. that is displayed to the user during the course of the tour. In one embodiment, the sequence, picture, diagram, etc. is a video clip shot while moving along the associated path in the real environment. The sequence or picture may take other forms as well, such as computer-animated image frames showing a path through a virtual environment. Image sequences, pictures, diagrams, etc. may reside on the host computer or on remote servers located anywhere on the World Wide Web. For instance, in some embodiments, image sequences may be shown using streaming video.

HotSpots represent a linkage between an area of a navigation frame, for example, an object in the frame, and a set of associated data. A HotSpot is represented on the map by an icon and in the main view image display by a bounded region of interest (ROI). Associated data with an HotSpot may take a variety of forms including, but not limited to, video sequences, animations, audio clips, text, still images, and World Wide Web links. When a HotSpot is activated during the course of the tour, the associated data may be displayed in the main view window or a popup view window.

In another embodiment, rather than associating a HotSpot with data, the HotSpot may be a link to other elements in the map, such as a node, another HotSpot, or any location within a branch. When a user clicks on such a link HotSpot, the execution of the program jumps to the element, highlighting the element, and positioning the video to the appropriate frame in the multimedia sequence included for that element, if any.

HotSpots can also be database queries rather than being associated with a data file. For example, a HotSpot may contain a connection string to a database and a query string. When a user clicks on the HotSpot, the query will be initiated and the result of the query will be displayed, for example, in a web page. The query may also trigger execution of a procedure in the database.

In a further embodiment, a HotSpot may be an event. Rather than waiting for a user to click on the HotSpot, the content of the HotSpot can automatically pop up when the media sequence approaches that point within a delta specified time.

Given the underlying structure of the data, the following sections describe the operations that manipulate the data. The present invention provides three classes of capabilities: initialization, authoring (constructing and modifying the model), and playback (navigating the model).

Overview of Program Execution

When the program is started, a map view window 1120 (FIG. 11) is initialized with intersections or decision points, paths or steps, and HotSpots retrieved from model database 104. The default starting intersection or decision point, as defined in model database 104, is the initial start position. Main view window 1110 shows the image frame associated with the starting intersection, as well as any path choices 1130 leading away from the starting intersection.

Figure 12:
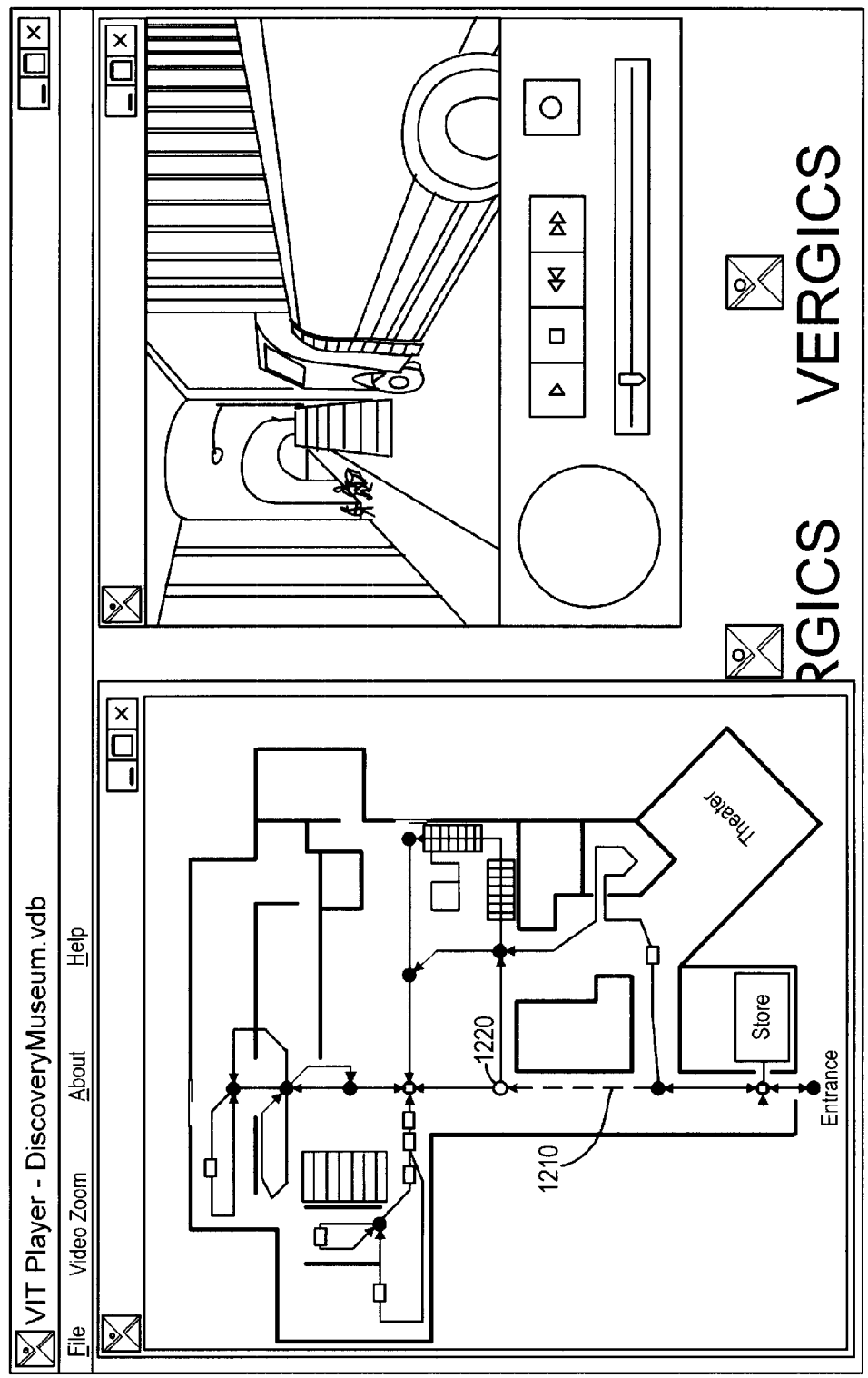

When the user selects a choice, the path represented by that choice and any destination intersections are highlighted in map view window 1120 (e.g., path 1210 and node 1220 in FIG. 12). The program plays the image sequence associated with the path (FIG. 12). Any HotSpots on the current path are highlighted on the map as the image sequence nears their locations, and the user receives both a visual and audio queue to the HotSpot's proximity (FIGS. 13-16).

Figure 11:
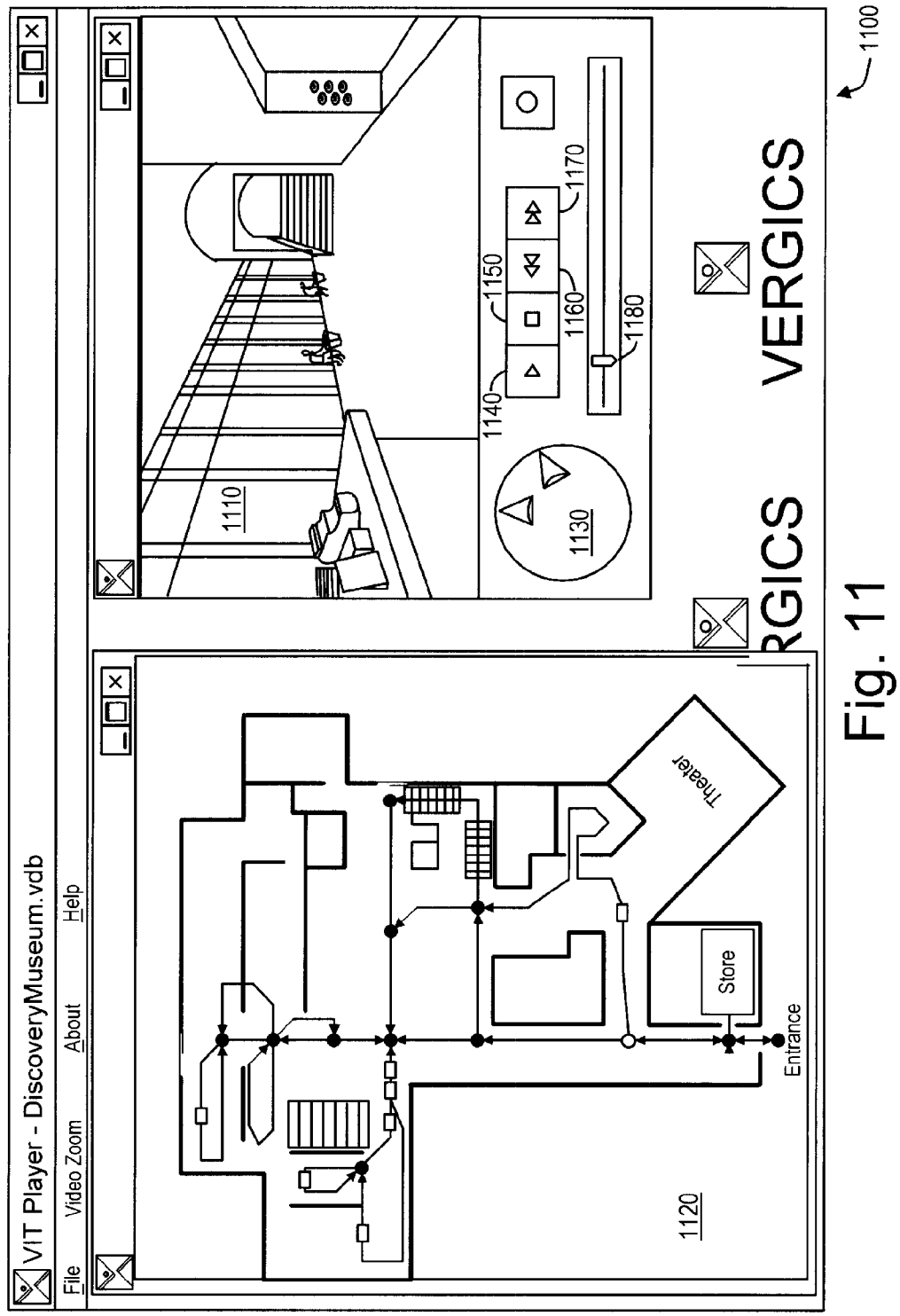
FIGS. 11-16 show respectively a window displayed on a screen of a display device of the computer system of FIG. 8, at successive points during navigation of a virtual environment.

As each image frame is decoded, the program updates the current frame number (or sample time). When the current frame approaches the end of the sequence range associated with the current path, the program displays the path choices available at the upcoming intersection (FIG. 11). If the user does not select a choice before the image sequence reaches the intersection, image playback is paused. If the user does select a choice, image playback proceeds directly with the image sequence for the selected path (i.e. image playback is not paused at the intersection).

The user may also control program execution in other ways. For example, the user can pause and continue image playback at will, and can jump to an arbitrary intersection or decision point by simply selecting a corresponding icon in map view window 1120. The user can also jump to any arbitrary point within a path by clicking at any place within the segments that make up the branch. Similarly, the user can jump to any HotSpot in the model by selecting a corresponding icon in map view window 1120.

Initialization

In the case of the authoring tool, the program is initialized by simply starting the software application. In the case of the player the following operations are performed:

Startup

This operation first creates a document, a model database, a stream object and a main view. A reference to the model database is then passed to the stream object and a reference to the stream object is added to the document.

Load Model File

This operation opens a model database file, connects the main view to the stream object created during Startup, creates a map view, and connects the map view to the main view stream object. The model database created during Startup is then populated with the contents of the model database file. A map is drawn using a bitmap file. Paths or steps, intersections or decision pints, and HotSpots from the model are overlaid on the background. The start position is initially set to the start node and the intersection or decision point icon is highlighted on a map displayed in map view window 1120.

Display Initial Image

This initial stream is opened and the image frame associated with the starting node is displayed in main view window 1110. User controls are attached to main view window 1110 and the stream is set to Pause, waiting for user input.

Authoring

Figure 17:
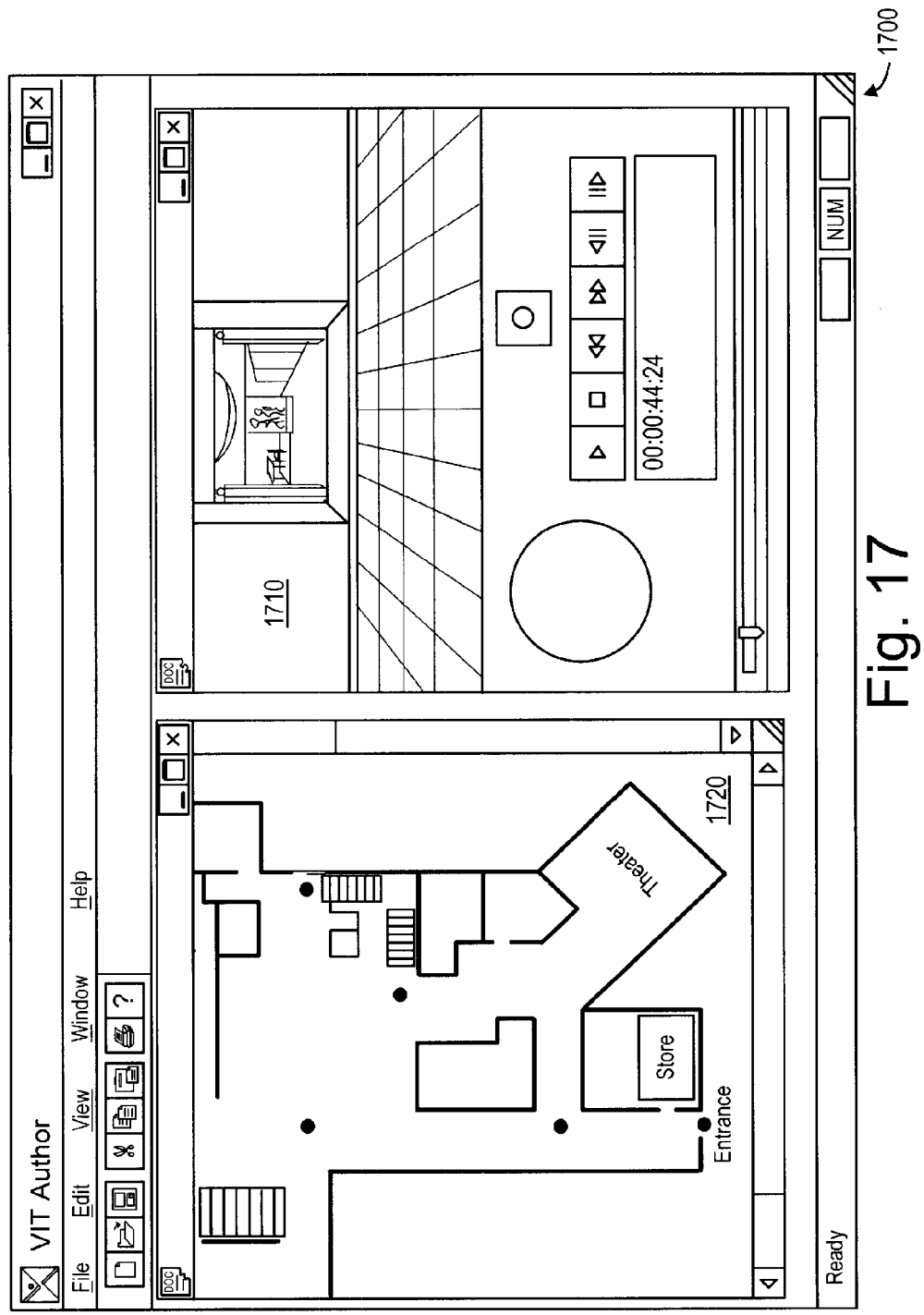
FIGS. 17-22 show respectively a window displayed on a screen of a display device of the computer system of FIG. 8, at successive points during authoring of a virtual environment.

The general process of authoring is to construct a model by drawing elements in a map view window 1720 (FIG. 17) that are viewed in main view window 1710. Construction of a model typically begins with a diagram of the environment or process, a set of image sequences, and auxiliary data. The diagram is displayed as a bitmap in map view window 1720. The user defines model elements by drawing them over the diagram. For each path defined, the user selects an image sequence from main view window 1710 and attaches the image sequence to the path or step. For each HotSpot defined, the user selects auxiliary data and associates the auxiliary data with the HotSpot. Editing operations allow the user to modify the contents of any model element. The authoring program enables the user to perform the following operations:

Add Node: The user designates the location of the node on the map displayed in map view window 1720. This operation draws an intersection or decision point icon at the designated location, as shown in FIG. 17, creates the node in the model, and records the location of the intersection or decision point in the node.

Delete Node: The user selects an intersection or decision point icon on the map displayed in map view window 1720. This operation removes the intersection or decision point icon from the map and deletes the associated node from the model. If the node is the start or end point of any branches, the branches are deleted as well (see operation Delete Branch).

Figure 19:
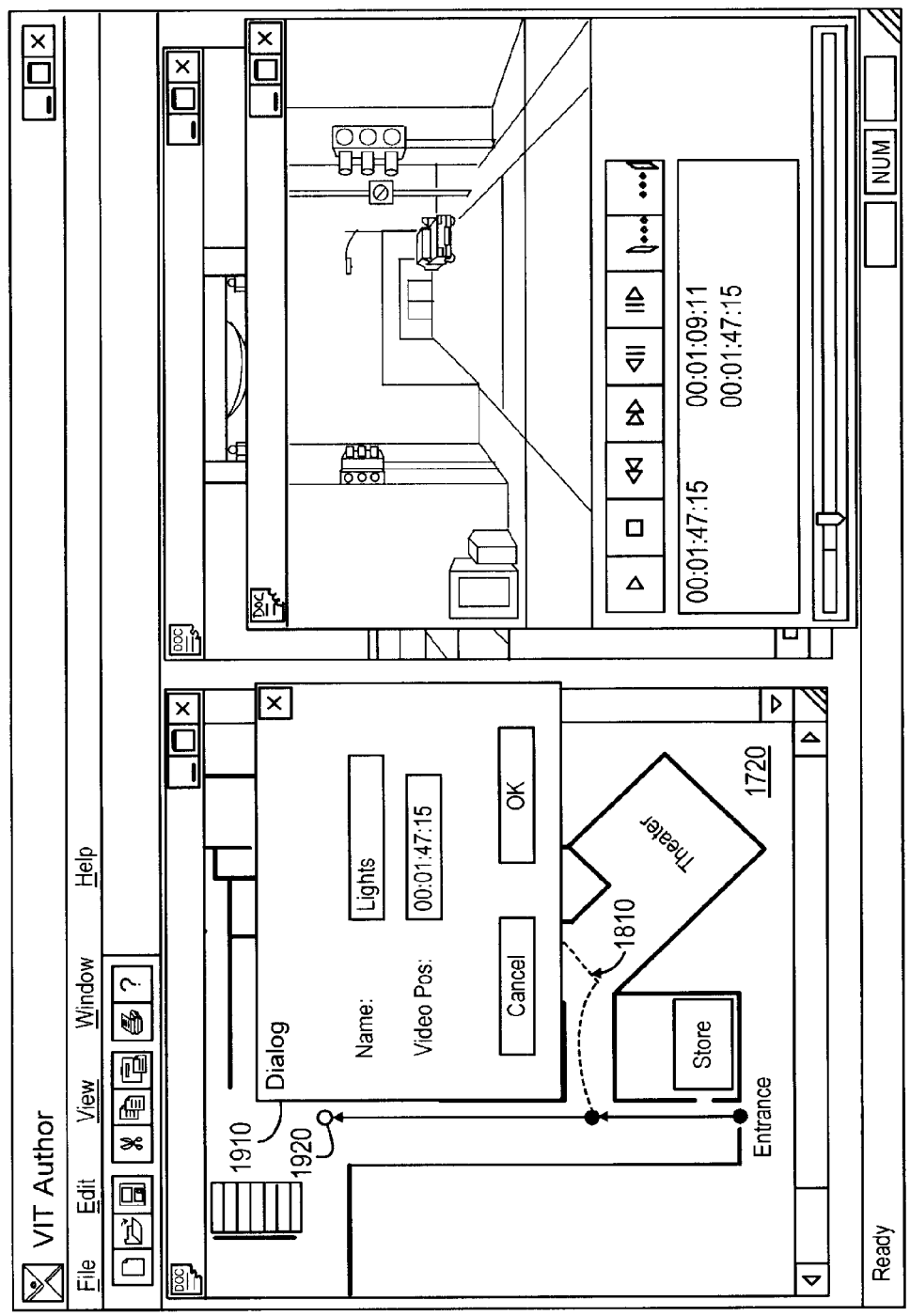

Edit Node: The user selects an intersection or decision point icon on the map displayed in map view window 1720. This operation then displays a dialog 1910 (FIG. 19) wherein the user can modify any of the data contained in the associated node 1920.

Figure 18:
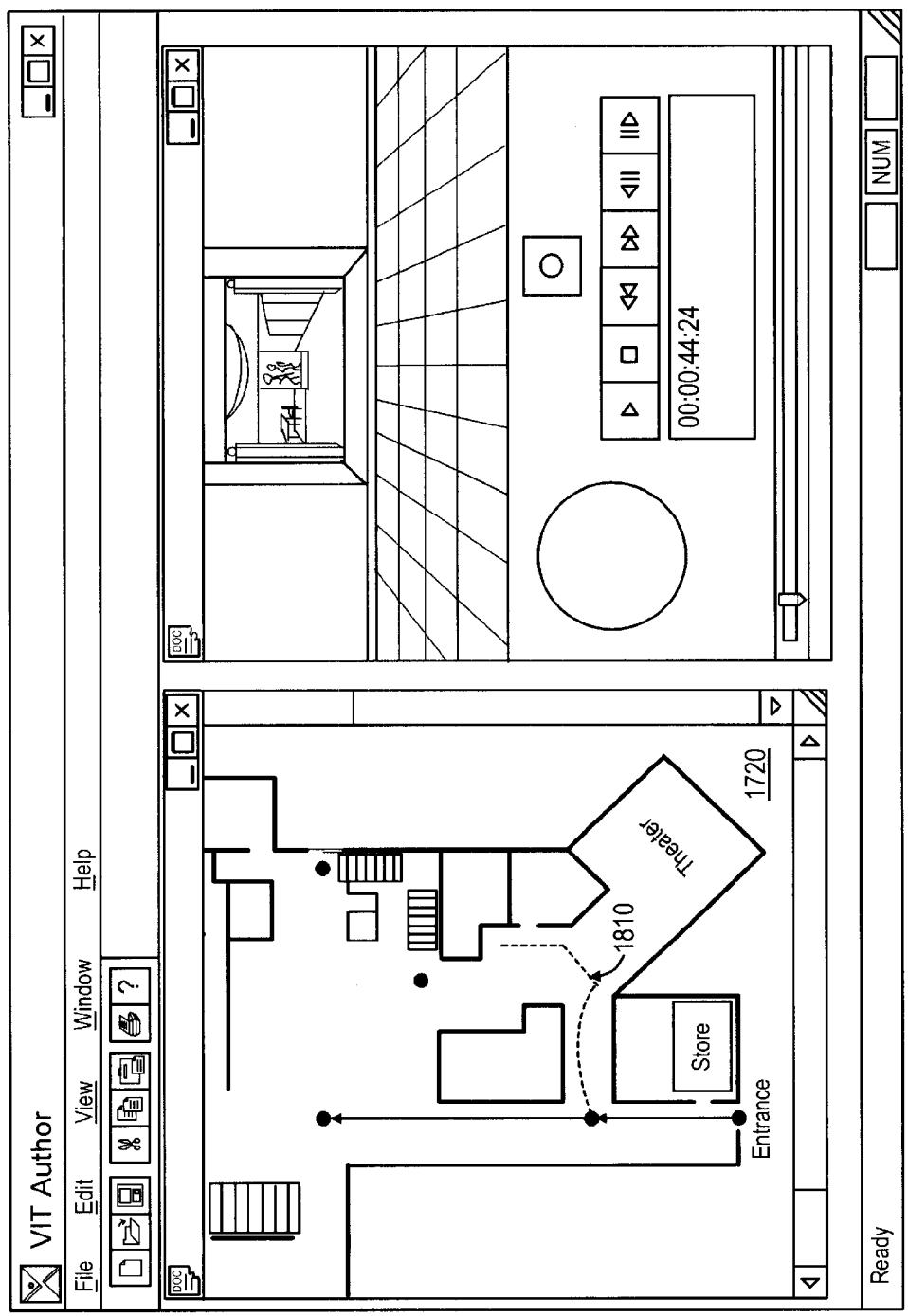

Add Branch: The user draws a path or step on the map displayed in map view window 1720. To draw the path or step, the user starts at any intersection or decision point and then draws a series of connected line segments 1810 that end at another intersection or decision point (FIG. 18). The shape of the path should closely approximate the shape of the actual path or step followed to produce the image sequence for the path or step. The user then designates a start and an end of the image sequence for the branch by selecting image frames in main window 1710. This operation creates a branch in the model, records a specification of the path or step (including all segments) in the branch, records references to the start and end nodes in the branch, and adds a reference to the branch to its start and end nodes.

Delete Branch: The user selects a path or step on the map displayed in map view window 1720. This operation removes the path or step from the map displayed in map view window 1720, deletes the associated branch from the model, and removes references to the branch from the two nodes connected by the branch.

Figure 20:
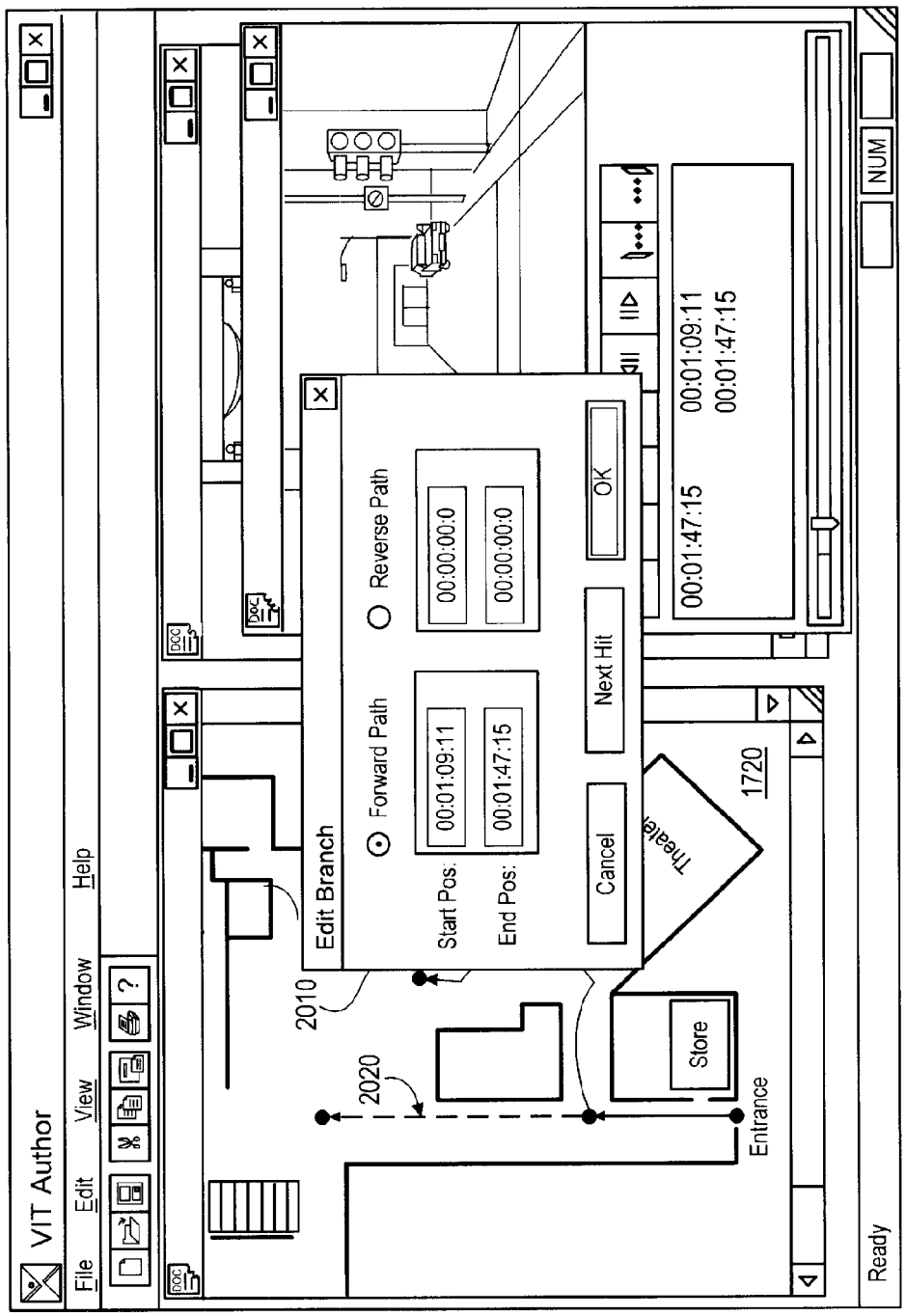

Edit Branch: The user first selects a path or step on the map displayed in map view window 1720. Then a dialog 2010 is displayed to allow the user to modify any of the data contained in the associated branch 2020, as shown in FIG. 20.

Figure 21:
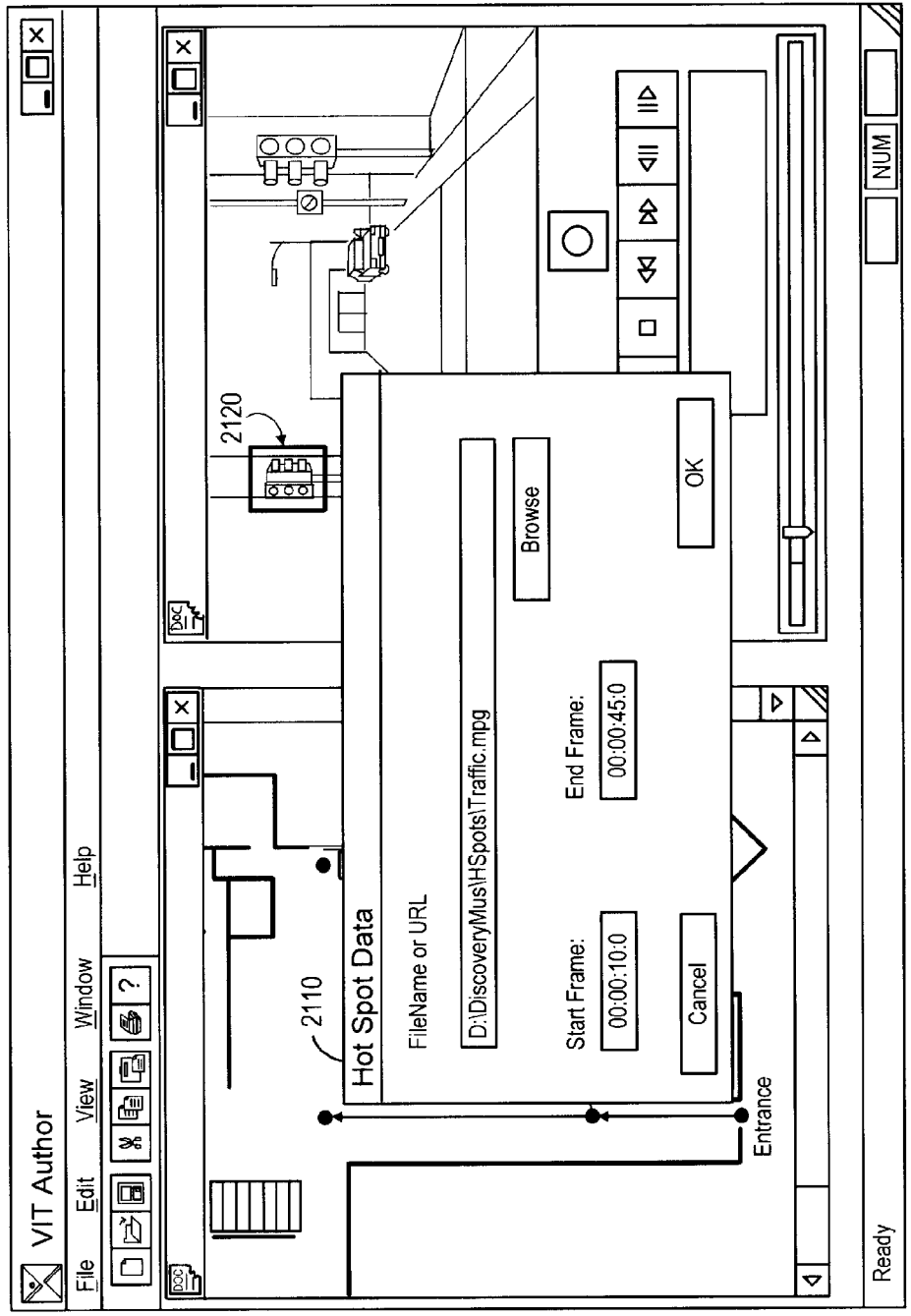
Figure 22:
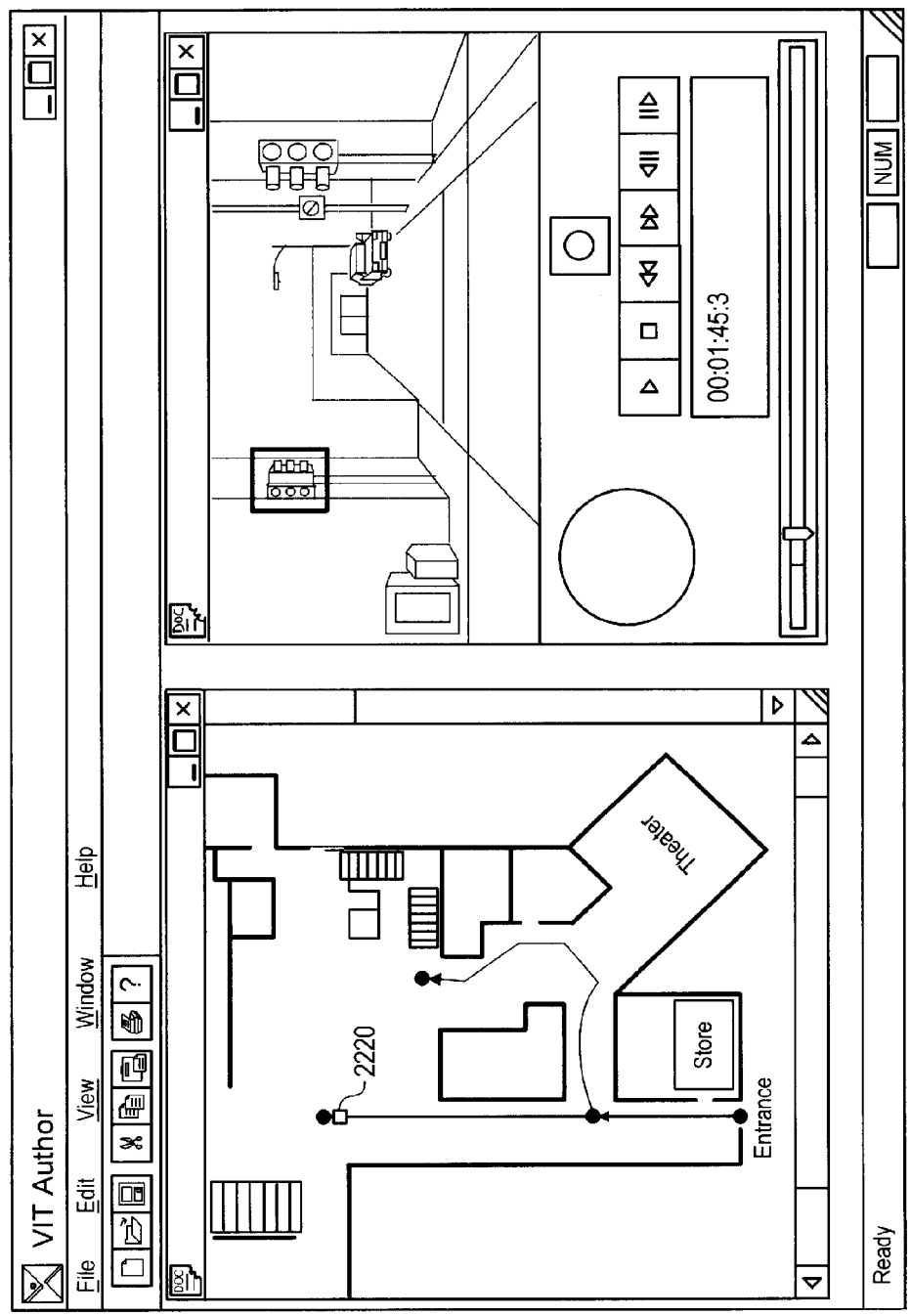

Add HotSpot: The user defines a HotSpot in main window 1710 with the image sequence paused at the desired frame (the image sequence must already have been assigned to a branch). The user then defines a HotSpot area by drawing a bounding figure around a region of interest 2120 in main view window 1710 (FIG. 21). The user specifies data to be associated with the HotSpot in a popup dialog 2110 (FIG. 21). This operation uses the offset of the image frame within the sequence to interpolate a position along the associated path or step on the map. Based on this information a Hotspot icon 2220 is drawn at a corresponding location on the map (FIG. 22).

Delete HotSpot: The user selects a HotSpot icon on the map displayed in map view window 1720. The HotSpot icon is removed from the map, the associated HotSpot is deleted from the model, and any references to the HotSpot are removed from branches associated with the HotSpot.

Edit HotSpot: The user selects a HotSpot icon on the map displayed in map view window 1720. A dialog box is then displayed to allow the user to modify any of the data contained on the corresponding HotSpot.

Add Branch Link: The user draws a path or step on the map displayed in map view window 1720, and optionally associates the path or step with an image sequence, in the manner specified with respect to the Add Branch operation. The user then specifies both a model document in database 104 and a node within that document's model as the endpoint of the branch link. This operation creates a branch link in the model, records a specification of the path or step (including all segments) in the branch link, records references to start and end nodes in the branch link, and adds a reference to the branch link to the start and end nodes. Note that the end node is not reached by traversing the branch link; the destination is the remote node.

Delete Branch Link: The user selects a path or step on the map displayed in map view window 1720. The path or step is removed from the map, the associated branch link is removed from the model, and references to the branch link are removed from the nodes connected by the branch link.

Edit Branch Link: The user selects a path or step on the map displayed in the map view 1720. A dialog box is then displayed to allow the user to modify any of the data contained in the associated branch link.

Save Model: The user is prompted for a file name, and the contents of the Model Database are written to the file specified by the user.

Playback

T The playback capability allows a user to execute the model, resulting in an interactive tour of the virtual or logical environment. There are two separate functions involved in playback: processing image frames and handling user input. Conceptually, the processing of image frames occurs iteratively in the main processing loop of the program, while user input is handled asynchronously.

The program initiates the playback capability by preparing map view window 1120. First a static background image is drawn, e.g., a building floor plan or other representation of a physical environment. Next the program draws each path or step, intersection or decision point, and HotSpot represented in model database 104. The program displays an image frame associated with the default initial node in main view window 1110. The program further displays available choices of outgoing branches from the initial node. Once the user selects a branch to follow, playback begins. The program highlights the selected path or step and the path or step's destination intersection or decision point on the map, and begins real-time display of the image frame sequence. As execution continues along a branch, the user may pause and execute any HotSpot encountered along the way. As execution reaches the end of the path or step, the program displays available branch choices for the upcoming node. The user makes a selection to continue execution.

In some embodiments, a node can be contracted such that all outgoing elements from it and all other map elements that are dependent on them (such as map-only hotspots, labels) will become invisible. When expanded, the elements outgoing from the respective node and their dependent elements will be recursively made visible. For example, when a user clicks on a contracted node, only the first level of outgoing branches and their nodes are shown, and so on. Rather than initially show the whole network, the map will expand in the direction chosen by the user. This may be desirable when the map contains a large network of elements and will become too cluttered if displayed as a whole. In another mode of operation, the user may right click the mouse on a node and choose to expand every outgoing elements recursively to the maximum depth, not just the first level.

Figure 4:
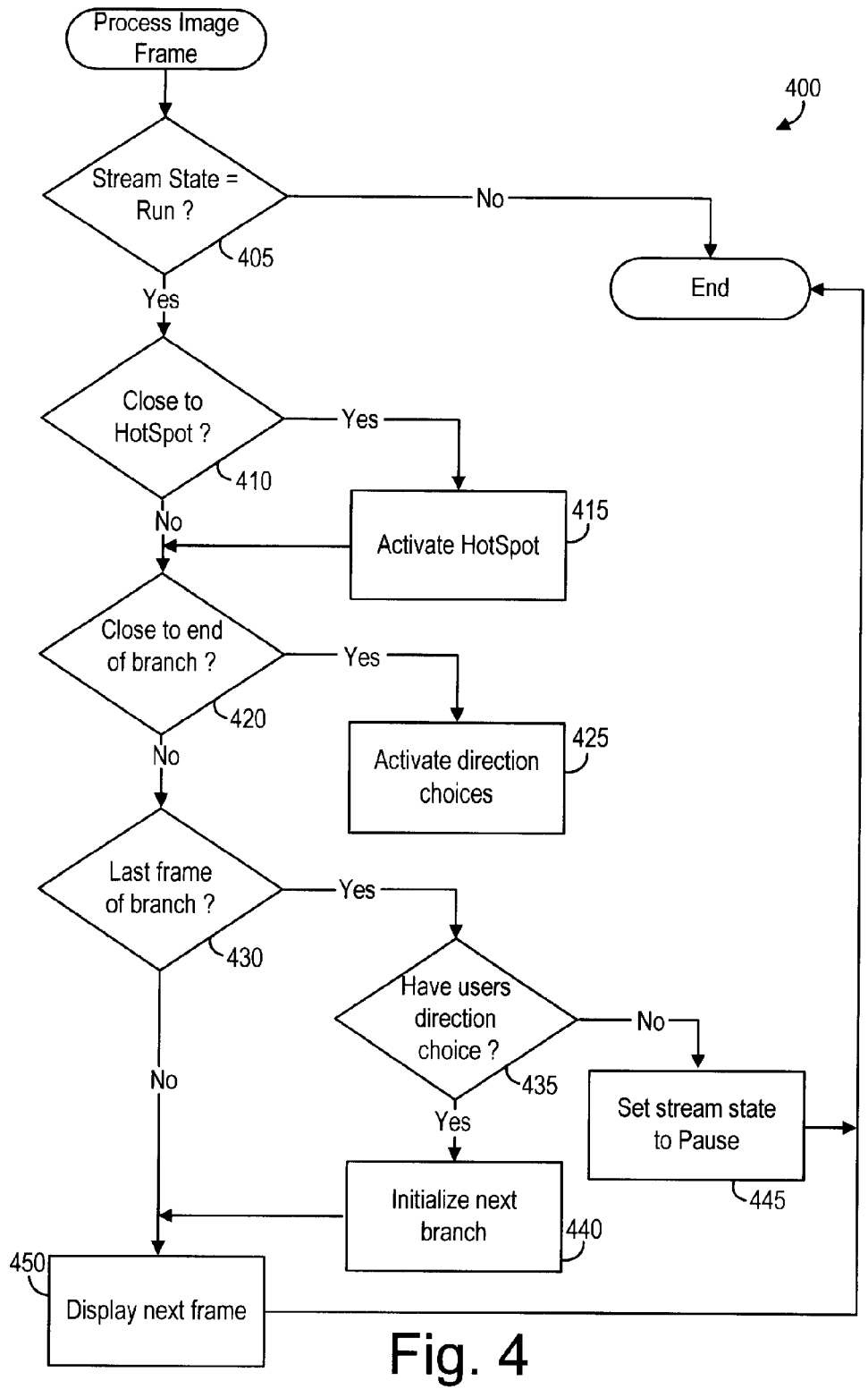
FIG. 4 is a functional flow diagram that illustrates the logic and actions of the image frame sequence processing function.

FIG. 4 is a flowchart of image frame processing operation 400. Operation 400 first looks for certain conditions that require special processing. When all conditions have been handled, the next available image frame is rendered. First, stage 405 determines whether the active stream is set to a Run state. If the stream state is not set to Run, image playback is paused and operation 400 terminates. Next, stage 410 determines whether the current frame is close to a HotSpot. Proximity is determined either with respect to a number of frames or to a time delta. If the test is true, in stage 415 the HotSpot is activated (e.g., by highlighting the HotSpot icon in map view window 1120 and alerting the user to the proximity of the HotSpot via a visual and/or auditory queue).

Figure 5A:
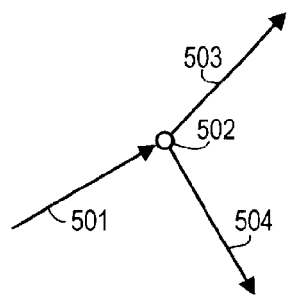
FIGS. 5a, 5b, and 5c illustrate respectively the rotation of path vectors from absolute to user-relative coordinates.
Figure 5B:
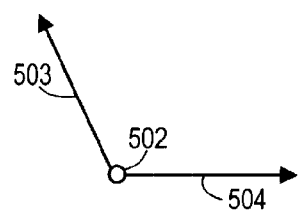

Stage 420 then determines whether the current frame is at the end of the current branch. Proximity is again determined either with respect to a number of frames or to a time delta. If the test is true, path or step choices are activated in stage 425. Path or step choices are the set of paths or steps branching out from the upcoming intersection or decision point. Activation includes first calculating the set of path or step choices and then displaying the choices for user selection. Calculation may be required because path choices may be displayed relative to the current direction of travel (i.e. from the user's viewpoint), rather than according to a fixed coordinate systems. Directions relative to the user's viewpoint are used for physical environments. Absolute coordinates are used for logical coordinates. FIG. 5a illustrates a sample scenario where path 501 enters intersection 502, and paths 503 and 504 leave intersection 502. If the current playback location is along path 501, the choices presented to the user at intersection 502 are to take either left path 503 or right path 504. FIG. 5b illustrates these choices from the user's viewpoint. Since display of path choices is from viewpoint of the user, the current direction of travel by the user corresponds to straight upscreen, 90 degrees left and right correspond to straight left and right, respectively, on the screen, while 180 degrees backwards corresponds to straight downscreen.

Figure 5C:
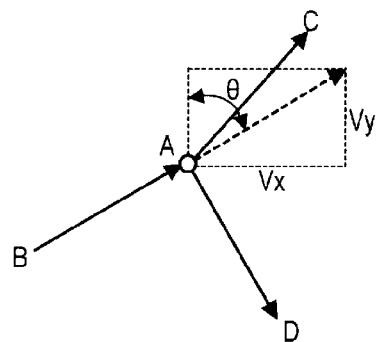

Calculation of path choices is accomplished as follows. Recalling that a branch may represent a path of multiple line segments, the geometrical orientation of an outgoing branch is determined by a vector of a first line segment to the branch. The orientation of an incoming branch is likewise determined by a vector of a last segment in the branch. The incoming direction vector (representing the user's point of view) is rotated such that the vector points "up" (i.e., the vector aligns with a 90 degrees angle). The difference angle between the original orientation of the incoming vector and the rotated vector is the angle by which all of the outgoing branch's vectors are rotated. In FIG. 5c, segment BA is the vector of the incoming branch (path 501), and segments AC and AD are the vectors of outgoing branches 503 and 504. For each outgoing directional vector (xy), $newX = x^* \cos \theta - y^* \sin \theta.$ $newY = x^* \sin \theta + y^* \cos \theta.$ where $\theta$ is the difference angle.

As shown in FIG. 5c, $\sin \theta$ and $\cos \theta$ represent components Vx and Vy, respectively, of the incoming vector, so there is no need to compute the actual difference angle.

Figure 6:
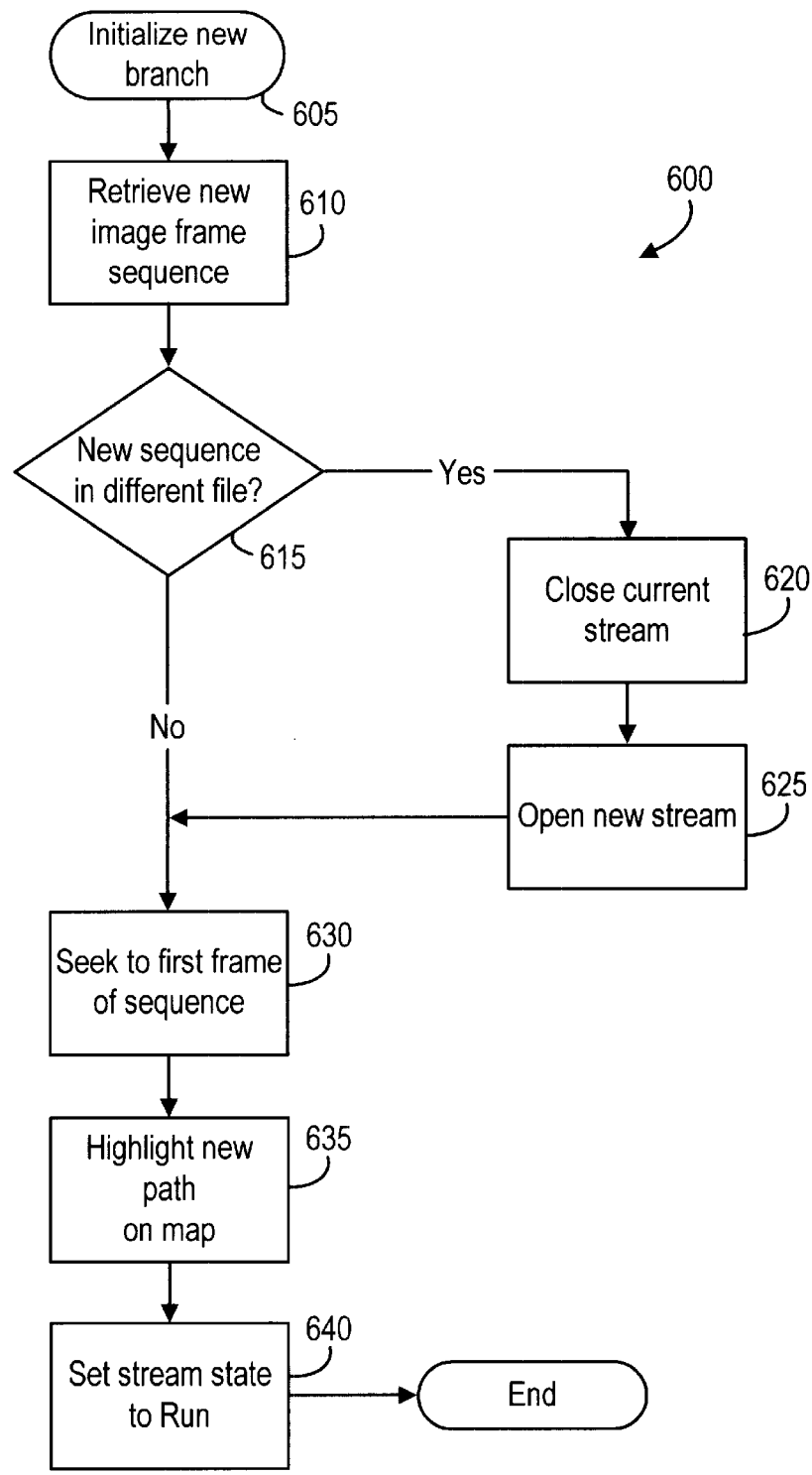
FIG. 6 is a functional flow diagram that illustrates the process of initializing a new branch for playback.

Finally, stage 430 determines whether the current frame is the last frame of the branch. If the test is true, stage 435 determines whether the user has chosen a branch to proceed on. Otherwise the stream state is set to Pause in stage 445 and operation 400 terminates. If a branch choice is available, the image frame sequence that corresponds to the chosen branch is initialized in stage 440, as illustrated in FIG. 6 (operation 600). First, the location of the next image frame sequence is retrieved from the new branch in stage 610. Stage 615 then determines whether the next sequence is stored in a different file from the current sequence, in which case the stream of the old file is closed in stage 620 and a stream for the new file is opened in stage 625. The program then seeks to the first frame of the sequence, in stage 630. The path or step on the map that corresponds to the new branch is highlighted in stage 635. Finally, the program sets the stream state to Run in stage 640 and operation 600 terminates.

The final step in operation 400 is to render the next image frame in main view window 1110 in stage 450.

During image frame processing, the user can manipulate various controls to control playback. The present invention interleaves handling of asynchronous input events with image frame processing. The following sections describe the processing of possible input events.

Choose Branch: Each node in the model has one or more branches leading away from the node. In two instances, when the tour reaches a node and when an input event causes a jump to a node, the user must choose a branch to follow away from the node. The program displays branch choices available to the user as control icons in main view window 1110. The user selects one of the icons, indicating the preferred choice (FIG. 12). This action triggers the Choose Branch input event. The program processes the event by storing the chosen branch. The choice is then retrieved and used by the image frame processing loop as described above.

Jump to Node: At any point, the user may cause the image frame display to jump to an arbitrary node in the model by selecting an associated intersection or decision point in map view window 1120. This action triggers a Jump to Node input event. Upon receiving the event, the program identifies the image frame associated with the selected node. If the new image frame is stored in a different file than the previous image frame sequence, the program closes the previous input stream and opens a stream to the new image file. The program then sets the stream state to Pause and displays the image frame associated with the new node in main view window 1110. Note that this image frame is the final frame of one of the incoming branches. The program highlights the associated path or step in map view window 1120 to help orient the user at the new location. The program then calculates branch choices for the node and displays them in a correct orientation relative to the user's view point (FIG. 11).

Jump within a Branch: Since a sequence of data or media content is interpolated along a branch from the start node to the destination node, the user can click anywhere within the segments that make up the branch and the execution will jump to the respective frame in the data sequence that represents that point within a path.

Figure 13:
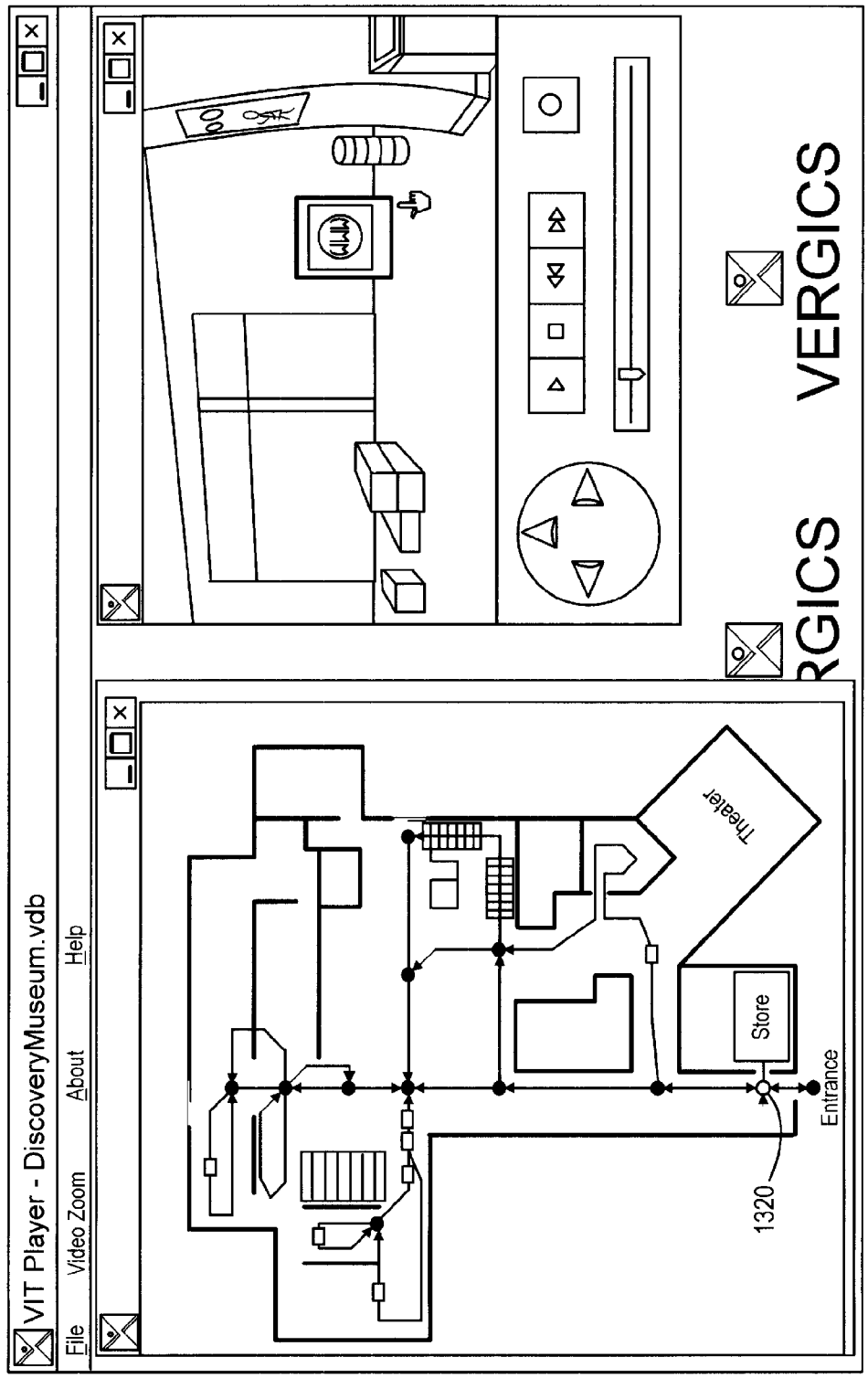
Figure 14:
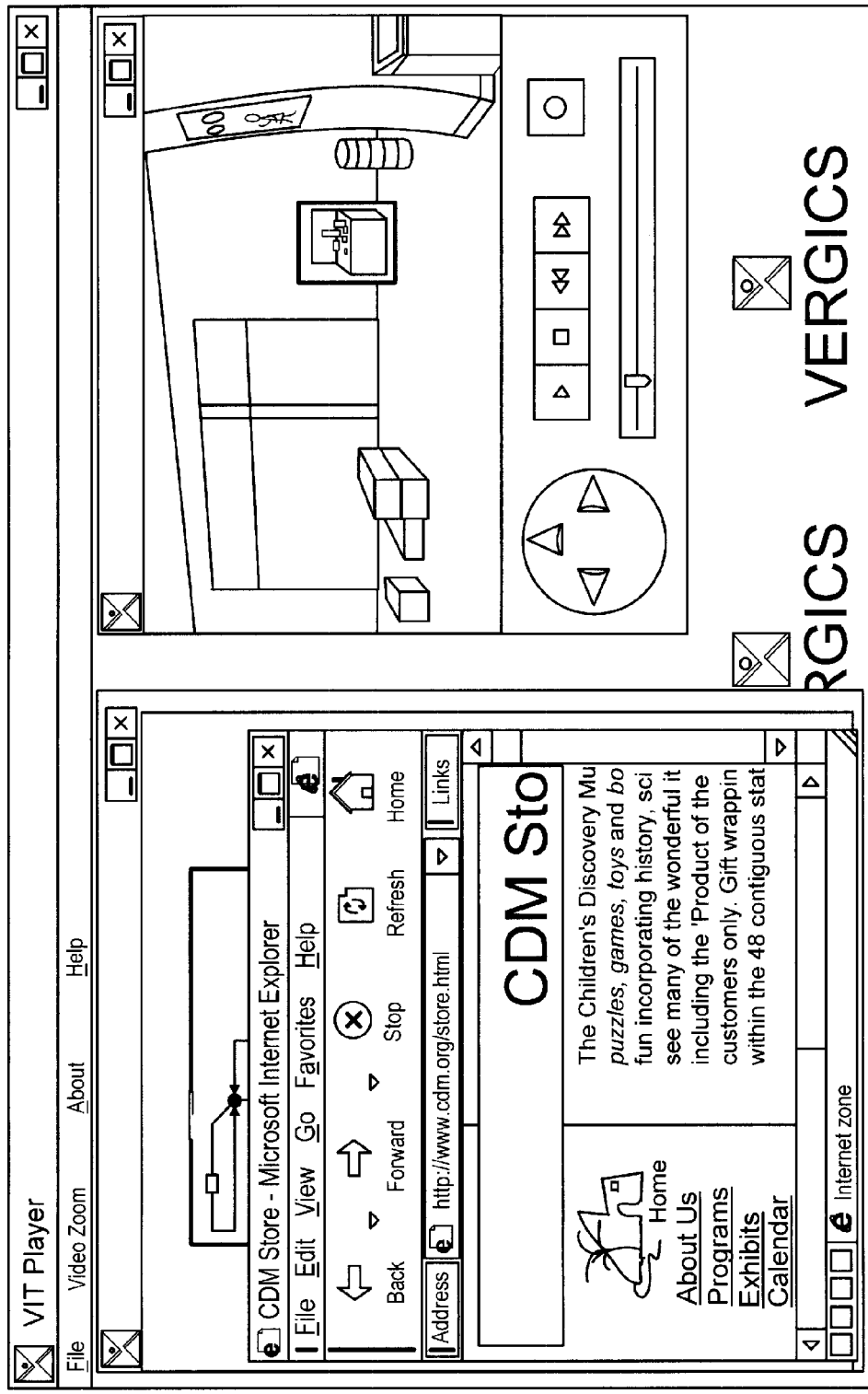
Figure 15:
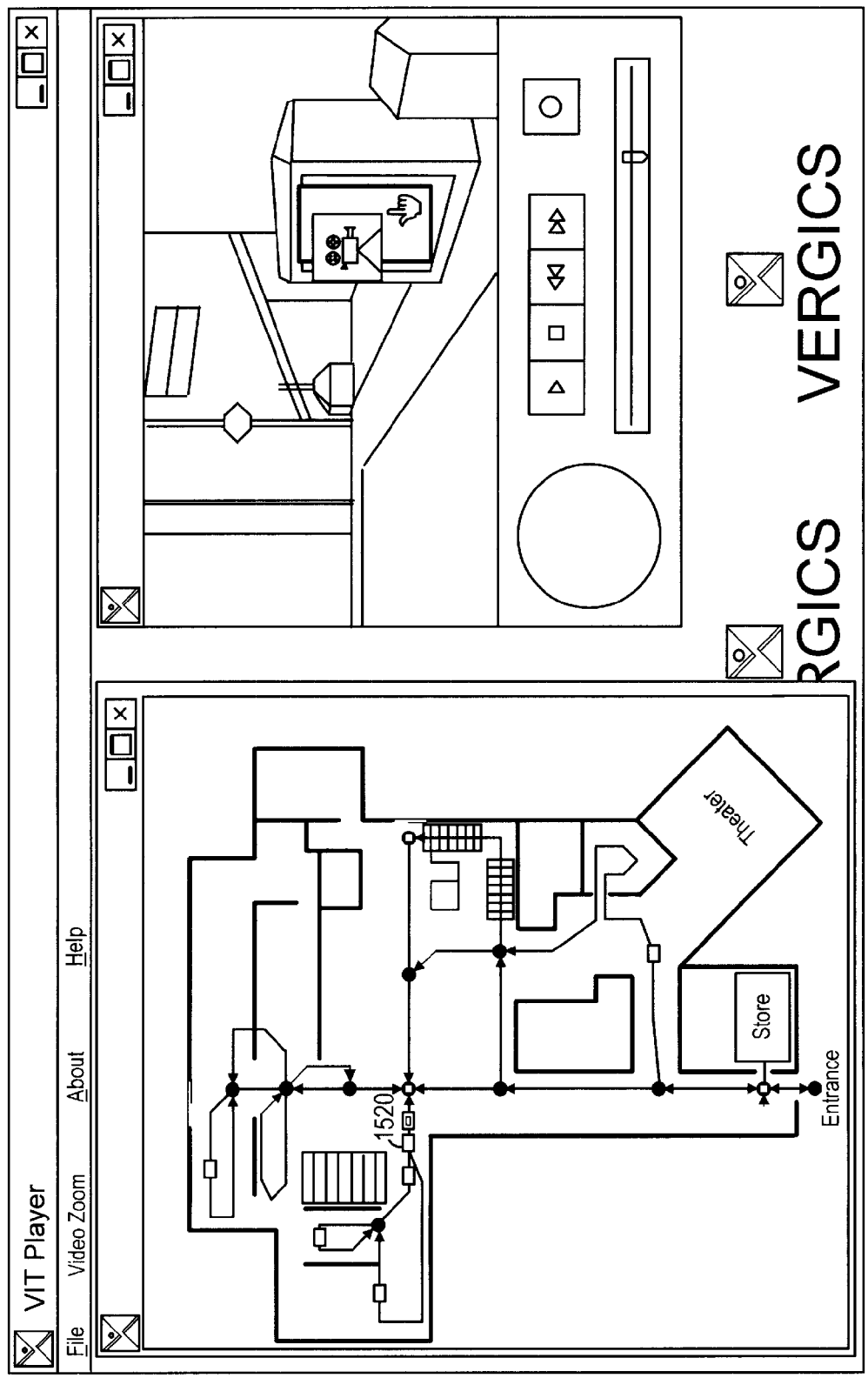
Figure 16:
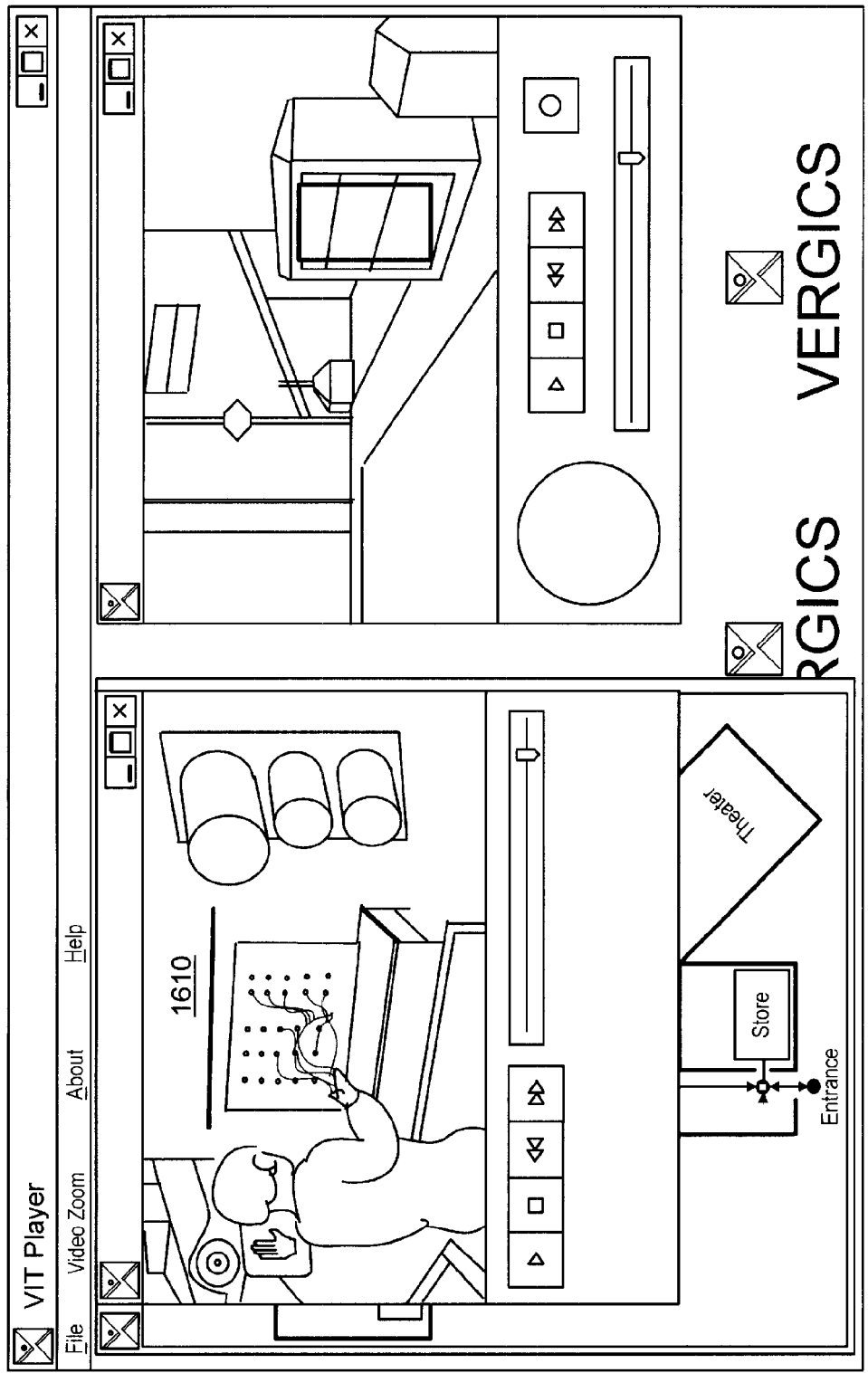

Jump to HotSpot: At any point, the user may cause the image frame display to jump to an arbitrary HotSpot in the model by selecting an associated HotSpot icon (e.g., HotSpot icons 1320 and 1520 in FIGS. 13 and 15, respectively) in map view window 1120. This action triggers a Jump to HotSpot input event. The processing of this event is similar to the processing of a Jump to Node event. The program initializes the image frame sequence for the branch on which the HotSpot is located. The program then displays a particular image frame associated with the HotSpot and highlights the new path or step on the map. Finally, the program overlays the HotSpot's bounded region of interest on the displayed video frame and highlights the HotSpot icon on the map (FIGS. 13 and 15).

Open HotSpot: Whenever a HotSpot region of interest is displayed in main view window 1110, the user may open the corresponding HotSpot by selecting the region of interest. This action triggers an Execute HotSpot event. Upon receiving this event, the program first determines the type of document (e.g. text, image, audio) referred by the HotSpot. The program then pops up an appropriate type to window to display the data contained in the document (e.g., popup windows 1410 and 1610 in FIGS. 14 and 16, respectively). The program then opens the document and displays the document's contents in the pop up window. For streaming types of data (i.e., audio clips, video clips or image sequences), the program creates the stream and initializes a popup window to the starting frame specified by the HotSpot. User controls are then attached to the popup window and the stream state is set to Run. If the HotSpot is an interactive game or exhibit a database model file is loaded, but no map view window is created, since the map represents a conceptual flow.

Pause: At any point during playback, the user may cause the image frame display to stop at the current frame by selecting a Pause control 1150 in main view window 1110. Upon receiving this event, the program sets the stream state to Pause, thereby preventing the image display function from displaying subsequent frames.

Play: Once playback is performed, the user may cause image frame display to resume from the paused state by selecting Play control 1140 in main view window 1110. Upon receiving this event, the program sets the stream state to Run, thereby enabling the image display function to display subsequent frames.

Fast Forward: During image frame playback, the user may cause the program to increase the speed of frame display by selecting Fast Forward control 1170 in main view window 1110. Upon receiving this event, the program displays the remainder of the current image frame sequence (i.e., the current path or step) at double the normal speed rate (some frames may be skipped during this operation).

Fast Reverse: During image frame playback, the user may cause the program to display image frames in reverse order by selecting Fast Reverse control 1160 in main view window 1110. Upon receiving this event, the program displays the current image frame sequence in reverse order at double the normal speed rate (some frames may be skipped during this operation).

Browse: At any point, the user may cause the program to scan through all of the image frames in the model by use of the Browse control 1180 in main view window 1110. Browse control 1180 is continuously variable over a range of values. When Browse control 1180 is activated an event is opened that contains two values: a state value that indicates whether the control is engaged or disengaged and an index value that indicates the position of the control. Upon receiving this event, the program sets the stream state to Pause. If the control state is Engaged, the program maps the index value to one of the branches in the model and highlights the associated path on the map. If the control state is Disengaged, the program maps the index value and highlights a path or step as described above. The program further calculates a particular image frame within the branch's frame segment, retrieves that frame, and displays the frame in main view window 1110.

Figure 7:
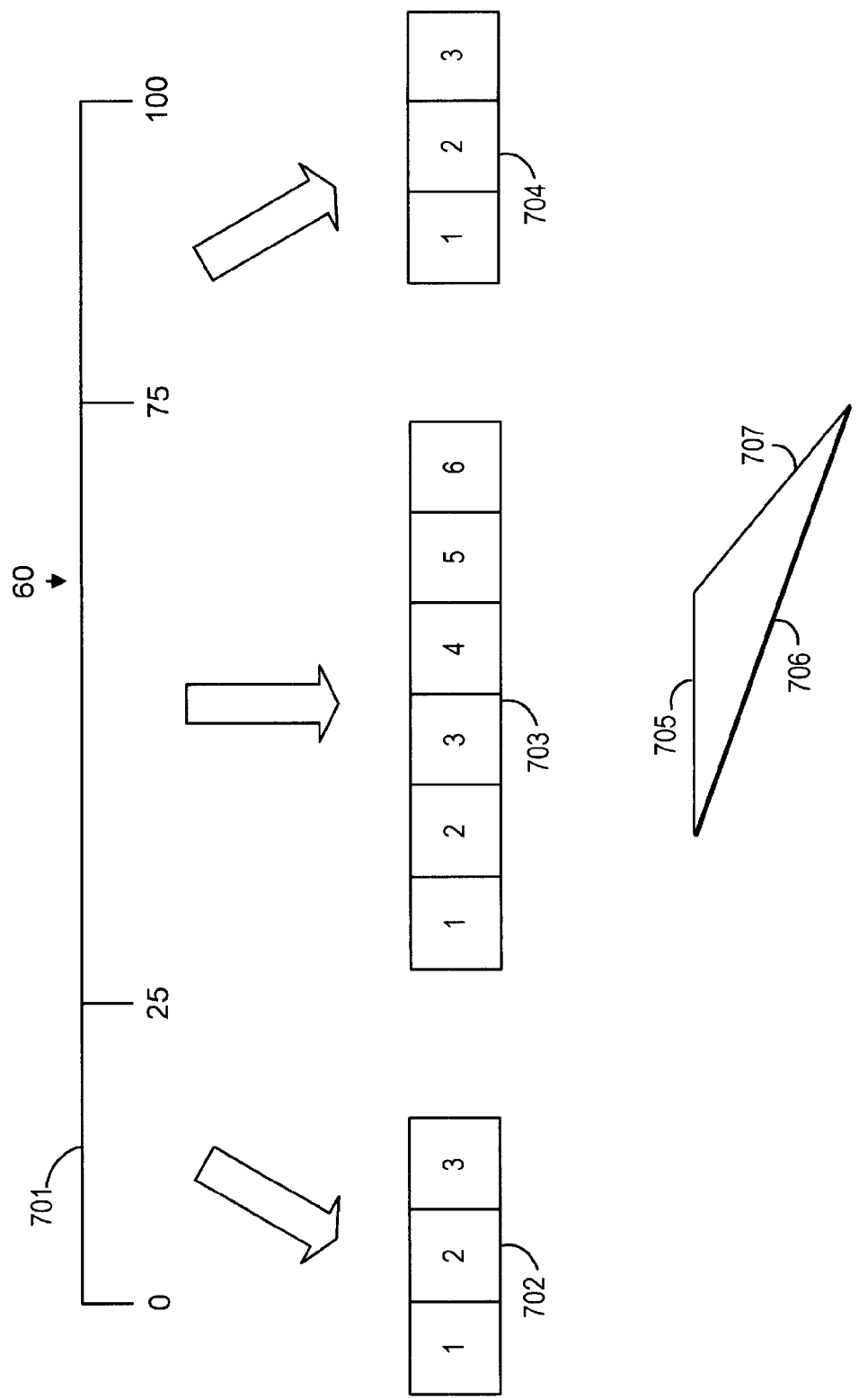
FIG. 7 illustrates the calculation of branches and image frames for the Browse event.

The image frame calculation is based on an arbitrary serial ordering of all branches in the model. This function maps the range of Browse index values over the resulting serial sequence. A specific index value is then mapped to an offset within a specific branch. The image frame at that offset in the branch's associated image frame sequence is then identified. FIG. 7 illustrates this function. Paths 705, 706, and 707 represent the branches of a simple model. They are associated with frame sequences 702, 703, and 704, respectively. A range of index values 702 maps to the three sequences, as shown in FIG. 7. For example, an index value of 60 falls within the sub-range that maps to sequence 703, and the program highlights path 706 accordingly. Once the offset of the given index value within the sub-range is calculated, it is straightforward to map to frame 5 in frame sequence 703.

Search: Each element in the network may have a unique ID that can be associated with keywords, metadata, etc. Standard searches can be performed on the data. The search result will carry the association and a list of items will be created, which will contain links to the elements in the model that satisfy the search criteria. Clicking on any item in the list will position the user to the respective node, branch, or HotSpot.

Figure 9B:
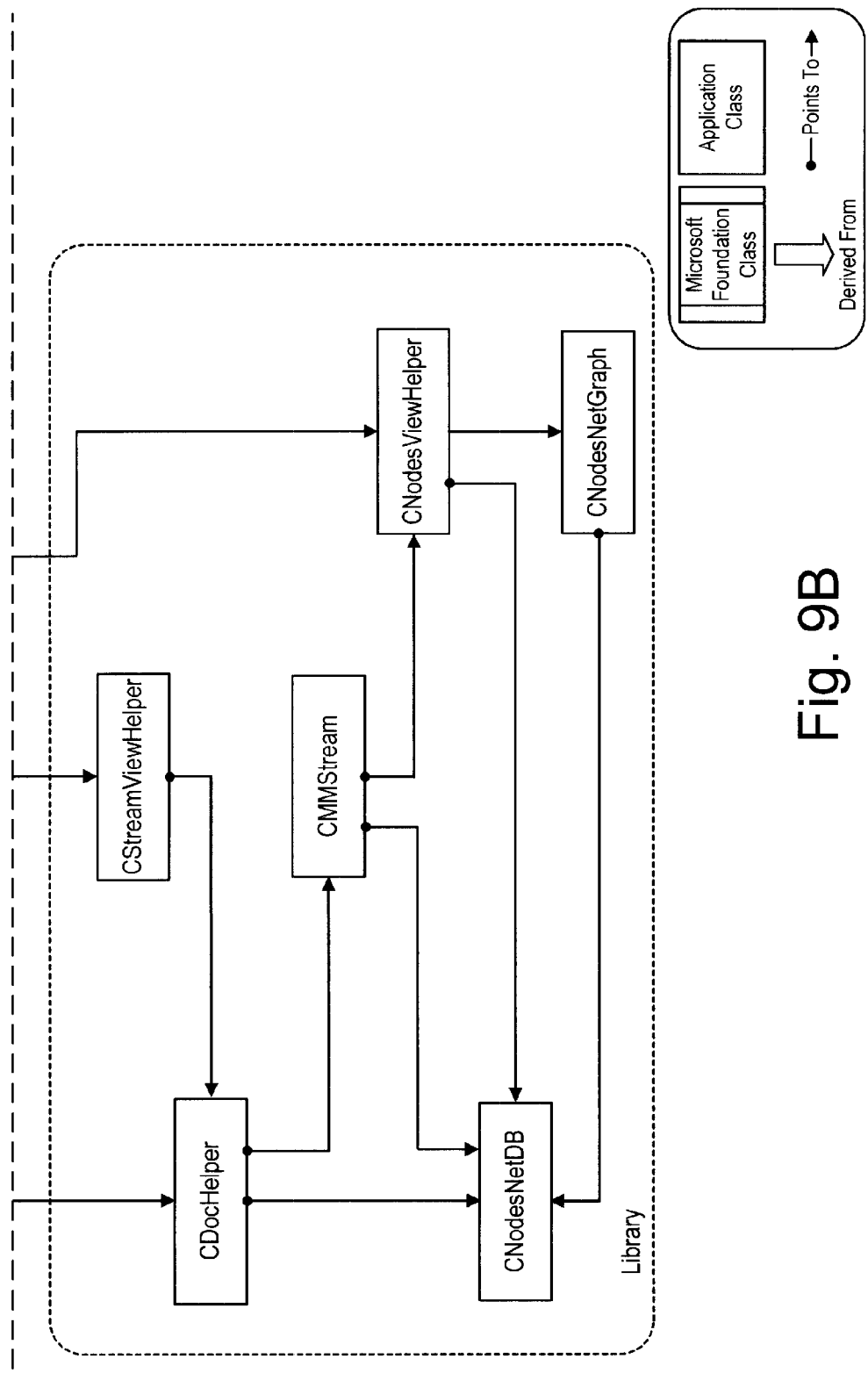
FIG. 9 illustrates the derivation of the software classes that comprise the application library.
Figure 10:
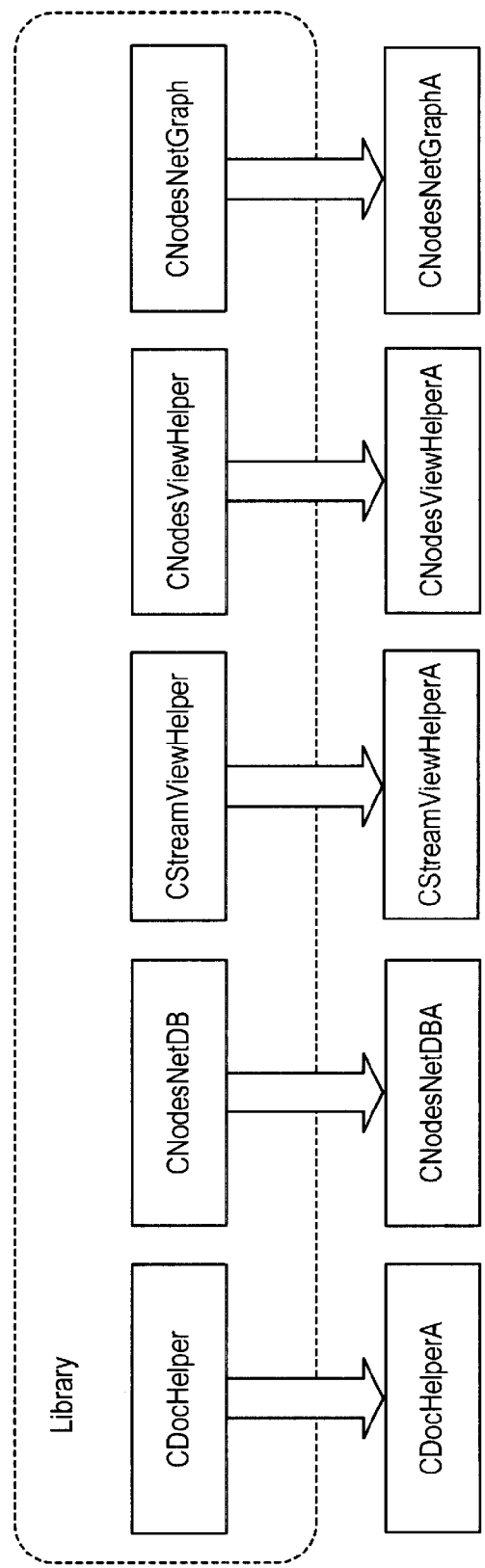
FIG. 10 illustrates the derivation of authoring classes from the application library.

FIGS. 9 and 10 show the architecture of the application software classes that implement the present invention. As illustrated in FIG. 9, the application software comprises a set of classes derived from the Microsoft Foundation Classes (MFC), as well as application classes that make up a separate application library. In addition to inheritance relationships between classes, the application specific classes are related to one another through pointer references. MFC-derived classes (VITAppObj, CMultiDocTemplate, CNetPlayerDoc, CNetPlayerView, CNodesView, CChildFrame, and CPlayCtrls) provide the operations that are specific to Microsoft Windows user interface. Examples of such operations are creating and deleting windows and receiving events from the pointing device.

Application specific library classes implement the core functionality of the program of the present invention. For instance, these classes implement the playback capability. The role of each of the application library classes is as described below:

CDocHelper: This class creates and stores each of the stream objects (CMMStream) needed by the document. This class also, keeps track of the currently active stream.

CNodesNetDB: This class stores and provides access to the elements of the model.

CStreamViewHelper: This class performs processing required for stream views (the main view and streaming popup views). This class further interprets and processes events (e.g. user controls and HotSpot invocation) received from one of these views by class CnetPlayerView.

CMMStream: This class performs processing required for streams (e.g. opening and closing stream files).

CNodesViewHelper: This class performs processing required for the map view. This class further interprets and processes events (e.g., jumping to intersections) received from the map view by class CnodesView.

CNodesNetGraph: This class draws model elements in map view window 1120.

A set of application classes derived from the application library classes add editing operations to the basic library operations. For example, these classes implement the authoring capability. FIG. 10 illustrates the relationships between library classes and authoring classes. It will be apparent to those skilled in the art that the operations of the playback program are a subset of those of the authoring program. That is, the authoring program contains every operation of the playback program, plus additional operations. These classes, and the additional operations that they provide, are described below:

CDocHelperA: This class provides the capability to select a bitmap file (static background) for the document. CNodesNetDBA: This class modifies the model database, both adding and deleting model element data.

CStreamViewHelperA: This class provides operations to modify stream views, specifically adding HotSpots to the view. This class invokes operations in CNodesNetDBA to update the database for new HotSpots.

CNodesViewHelperA: This class provides operations to modify the map view, specifically adding, deleting, and editing the model elements that are represented in map view window 1120 (e.g., nodes, branches, branch links). This class further invokes operations in CNodeNetGraphA to update the drawings of model elements in the map view.

CNodeNetGraphA: This class provides operations to modify the drawings of model elements in the map view.

A further embodiment of the present invention uses the model as the underlying representation of a video game. A video interactive game can be scripted entirely without programming or geometric modeling by constructing a graph of decision nodes with branches. The outgoing branches of a node represent actions or decisions that are taken in the flow of the game. Each outgoing branch has a distinct orientation vector. The game associates each unique vector with a user interface control. For example, assume a simple control device with three buttons (e.g. a three-button mouse). All vectors in the graph that are oriented at 90 degrees could be controlled by interface button A, all vectors at 45 degrees by button B, and all vectors at 180 degrees by button C.

Assume the game is initialized to start at some default node in the graph. If from that location the user pushes button A, the game follows the branch oriented at 90 degrees. This brings the user to the node at the end of this branch. If at this node the user presses button B, the branch at 45 degrees is followed, thus connecting to the next node. If there is no branch that corresponds to the input, the game position is not advanced. The game may also have disconnected nodes (nodes that cannot be reached by a branch in the graph) or, in fact, multiple disjointed graphs. In this case, the user interface must provide the capability to pass node identifiers to the program in order to effect jumps to disconnected nodes. Note that in this embodiment, the graph is not displayed as a map since it functions as a decision graph, rather than as a map of a spatial environment.

It will be apparent to those skilled in the art that the same program code is used to traverse the graphs in both embodiments. The difference between the environments resides in the format of the user interface.

Furthermore, application can be extended to support multiple players. Players navigating the same model can be represented on the map with different symbols and placed on appropriate locations on the branches they travel on.

Application can be integrated with other collaborative programs such as chat (text or voice), (e.g., Netmeeting). Players can then open a communication channel with other players by simply clicking on symbols corresponding to the other players.

Furthermore, computer-generated graphics can be integrated with the video to allow for more complex animations composite within video to support interactive 3-D games.

The present invention can also be applied to training materials for complex procedures. For example, a video illustrating the actual procedure taking place can be shown next to a conceptual flow of the presentation shown in map view window 1120 with the branches highlighting the current stage in the procedure. The user can insert additional types of HotSpots, such as personal notes and links to other pertinent information to help the learning process.

Figure 23:
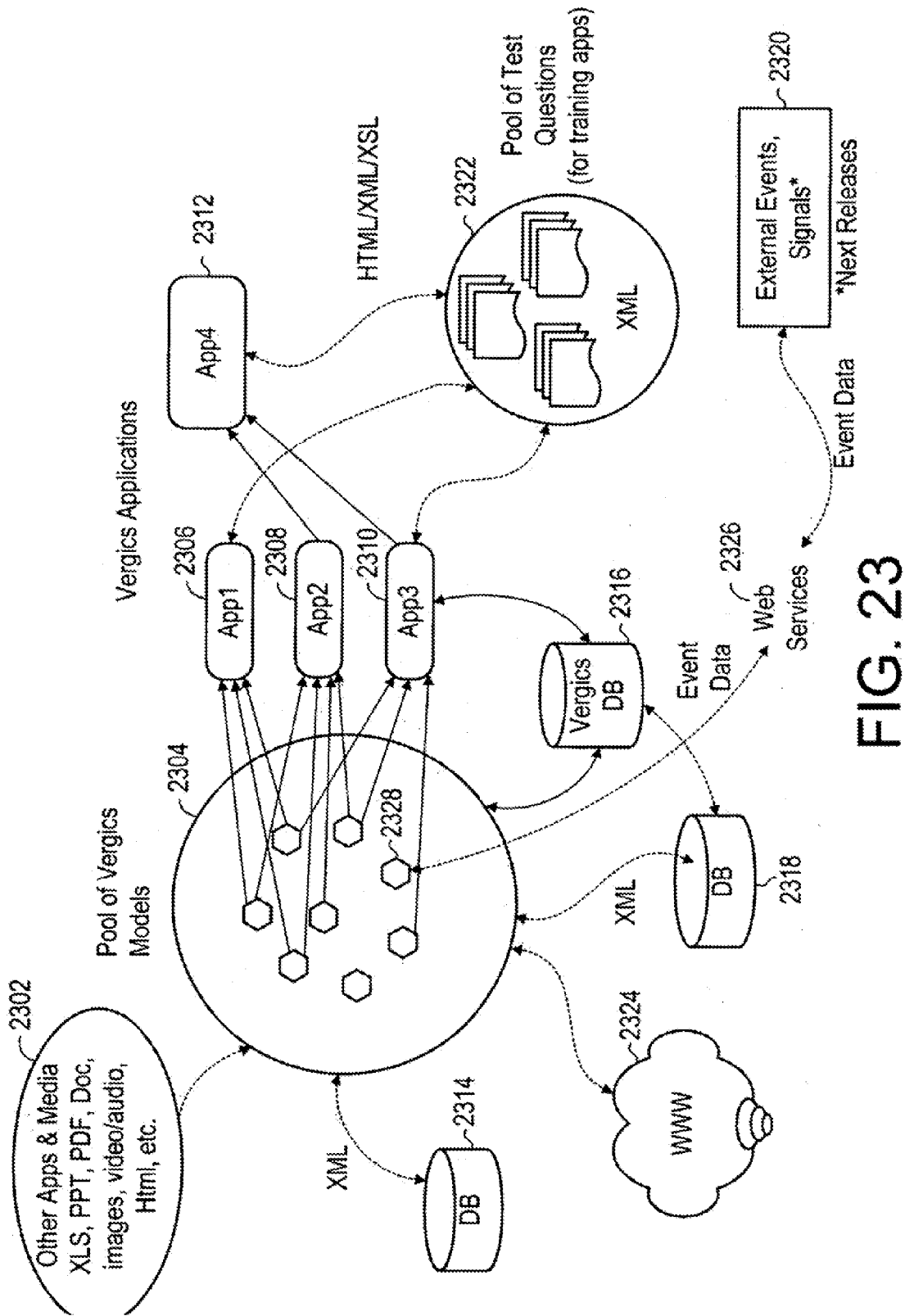
FIG. 23 illustrates the architecture of the principal design constructs, in accordance with some embodiments of the present invention.

FIG. 23 illustrates the architecture of another embodiment of the present invention. Shown is a pool of models 2304 that have been created using the methods specified above. Each model may encompass data from other applications and media 2302, outside databases 2314-2318, the World Wide Web 2324, and web services 2326, which may be linked to external events, signals, etc. 2320. The pool of models 2304 are then linked to applications 2306-2312. Each application may also be linked to outside databases and other information. For example, application 2310 is linked to database 2316 and application 2312 is linked to a pool of questions 2322.

Figure 24:
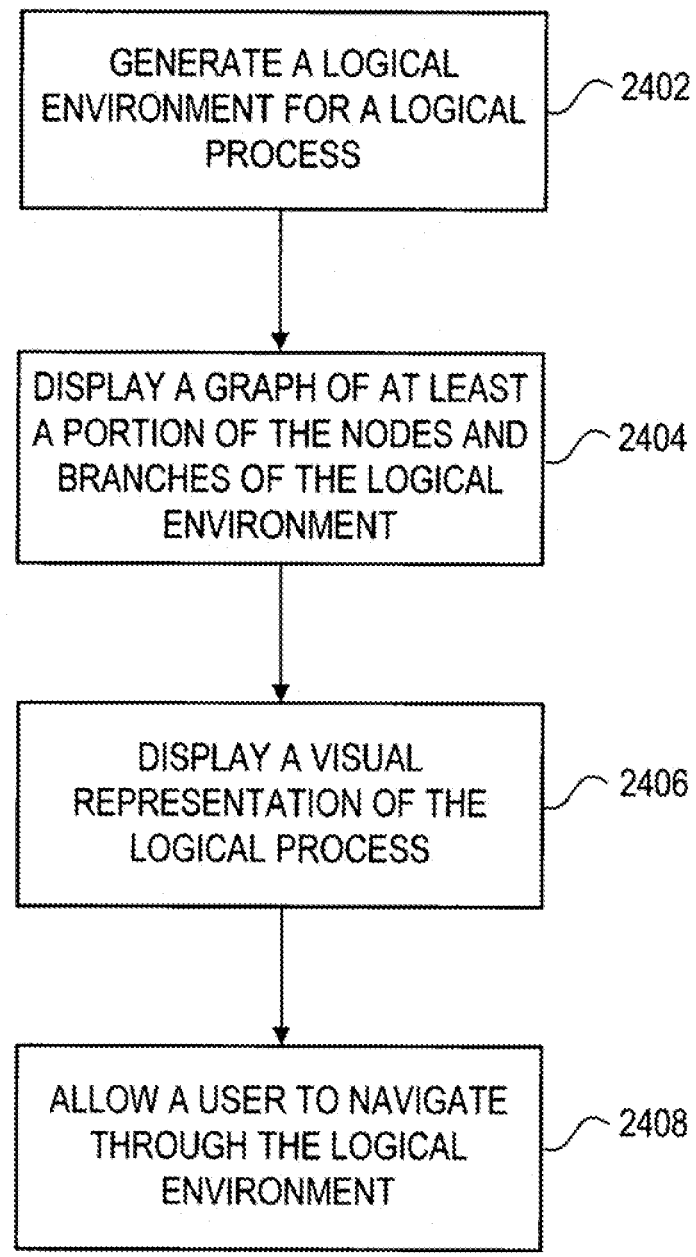
FIG. 24 is a functional flow diagram that illustrates the process of mapping a logical process, in accordance with some embodiments of the invention.

Shown in FIG. 24 is a flow diagram of a method of mapping logical processes. At 2402, a logical environment is generated from a logical process. The logical environment includes a plurality of nodes connected by branches. Each node represents a decision point in the logical process. Each branch represents a step, a sequence of steps or stage in the logical process. A map of at least a portion of the nodes and branches of the logical environment is displayed in a first window of a display device of a computer (2404). A visual representation of the logical process is displayed in a second window of the display device (2406). A user is allowed to navigate through the logical environment at 2408 by entering navigation commands relative to the displayed map via at least one input device connected to the computer.

Figure 25:
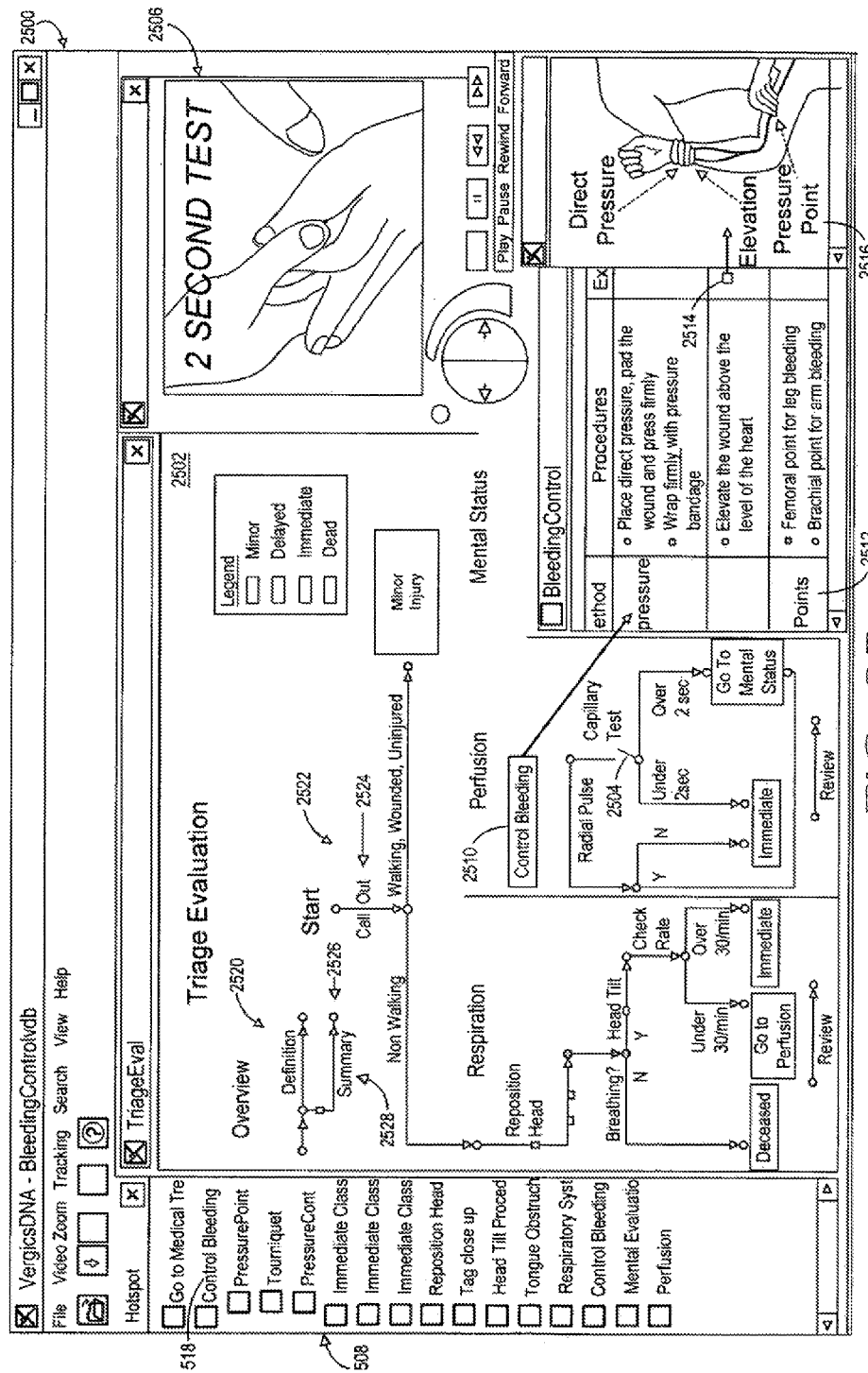
FIG. 25 shows a window displayed on a screen of a display device of the computer system of FIG. 8 during navigation of a logical process.

An example of a logical process that has been mapped is shown in window 2500 of FIG. 25. One difference between mapping logical processes versus mapping spatial environments is that a flag is set so that the outgoing paths from a node are expressed in absolute map coordinates rather than being rotated to the incoming branch point of view. For example, the rotations illustrated in FIGS. 5a, 5b, and 5c need not be performed.

Map view window 2502 shows a diagram flow of a process for triage evaluation. Yellow triangle 2504 in map view window 2502 tracks the flow of the process displayed in main view window 2506. A user can jump anywhere on a graph in map view window 2502 by clicking on a node, a HotSpot, or anywhere within a branch. When the user clicks anywhere within the process on the topological graph, the video or data displayed in main view window 2506 is indexed to the appropriate frame corresponding to the point in the step or stage.

Hotspots window 2508 contains an explorer tree that includes all of the HotSpots or the drill down points available in a particular model. When the user clicks an item in the tree, the respective HotSpot on the graph in map view window 2502 is highlighted and blinking. The user can then click on that HotSpot to drill down to more information. If the HotSpot is a model itself, then the explorer tree expands to show a list of HotSpots in that model and a new window may be opened with a map of the HotSpot model. The hierarchy of models can be constructed to any depth level. When the model HotSpot window is closed, all of the hierarchy beneath it also closes and the explorer tree contracts the node for that particular model. This way the explorer tree helps navigate between the vertical layers of the application.

ControlBleeding HotSpot 2510 in map view window 2502 is highlighted and shown in window 2512. The explorer tree in hotspots window 2508 has expanded ControlBleeding HotSpot 2518, which is a model itself, to show all the HotSpots within it. From the ControlBleeding model in window 2512, the user has highlighted and opened PressureCombination HotSpot 2514, which is shown in window 2516.

In one embodiment, logical processes may be represented by two or more disjointed graphs that are logically connected. For example, a branch in one disjointed graph may be logically linked to a node in another disjointed graph. Referring to FIG. 25, call out branch 2524 in graph 2522 is logically linked to node 2526 in overview graph 2520. Thus, if auto play is set, then execution will automatically jump from summary branch 2528 to call out branch 2524 when node 2526 is reached.

Additionally, video games or interactive exhibits can be scripted by building the network of decision points and branches, with no special programming.

Furthermore, stories with multiple alternative endings can be developed in accordance to the principles of the invention. For instance, an application can be built where kids assemble segments of the story in different ways to create new stories.

Virtual shopping mall and virtual stores can also be developed in accordance to the principles of the invention. Currently on-line shoppers must know in advance exactly what they want to search within a category. By associating HotSpots to items shown in a moving video of a real store, the computer system of the present invention replicates a real life shopping experience, allowing, for example, impulse buying. Users can obtain more information about an item shown in the video by simply clicking on a corresponding hot spot. The item is, in turn, associated with unique URL of a corresponding e-commerce database associated with the site. Users can thus add the item to their electronic shopping basket.

In a further embodiment, sub-tours or specific solutions within a spatial or logical environment may be provided. For example, users may be allowed to ask questions such as "How do I do this?" or "How do I get to point B?" Ordered lists of elements that represent a certain solution or itinerary within a graph is generated. The nodes, branches, and HotSpots that are part of that solution will be highlighted. A sub-tour can be created at authoring time by clicking on each element in the sequence of elements that make up the sub-tour and saving the sequence of elements. Alternatively, the sub-tour may be deducted from usage stats taken over a period of time. For example, the program may keep track of the model elements that users have visited, the number of times each element has been visited, the time stamp, etc.

Finally, the computer system of the present invention is also suitable for high-bandwidth applications. Video files encoded according to a broadcast quality standard such as MPEG2 can be streamed over high-speed networks to allow virtual visits to remote sites (e.g., museums, historic sites, etc).

Embodiments described above illustrate but do not limit the invention. In particular, the invention is not limited by any particular graphical user interface. In fact, any graphical user interface known in the art to perform the functions described herein can be used in accordance to the principles of the invention. In addition, the invention is not limited to any particular hardware or software implementation. Those skilled in the art realize that alternative hardware software implementations can be employed in lieu of the one described herein in accordance to the principles of the present invention. Other embodiments and variations are within the scope of the invention, as defined by the following claims.

I claim:

1. A method for providing a virtual tour of a shopping mall via an interactive map, the method comprising:

maintaining at least one database;

displaying on a display device a first portion of the interactive map generated from a logic process based on the database, wherein the first portion of the interactive map represents a first part of the shopping mall and includes different routes available in the shopping mall, each of the routes includes one or more nodes, one or more branches, and one or more of hotspots, each of the hotspots represents an event in the shopping mall;

displaying a sequence of images of a selected route to demonstrate what stores a user would see when going along the selected route in the shopping mall, wherein the image sequence being shown is synchronized with the interactive map in a manner that a jump from one image to another image in the image sequence leads to a corresponding leap motion in the interactive map being displayed;

accessing auxiliary data associated with the event when the user selects a hotspot along the selected route, wherein the auxiliary data is not part of the interactive map being displayed but is obtained from an external source; and displaying from the auxiliary data an visual effect about the event so that the user understands more about the event.

2. The method as recited in claim 1, wherein the event takes place in the shopping mall, the event pops out automatically when the sequence of images approaches the hotspot within a predefined time.

3. The method as recited in claim 1, further comprising:

accepting an input of a destination from the user; and highlighting a path to the destination in the interactive map.

4. The method as recited in claim 3, further comprising: displaying an indicator representing the user to move along the path while the image sequence is being shown, wherein the leap motion causes the indicator to move from the path to a new point in the interactive map being displayed.

5. The method as recited in claim 4, further comprising: displaying a video control to allow the user to fast forward, fast backward, play, or pause the image sequence.

6. The method as recited in claim 4, further comprising:

pausing automatically the video sequence when the video sequence approaches an upcoming intersection;

displaying choices available at the upcoming intersection; and displaying another video sequence when receiving from the user one of the choices, wherein the another video sequence proceeds with a selected path according to the one of the choices made by the user.

7. The method as recited in claim 4, further comprising: displaying any of the hotspots along the path in the interactive map as the image sequence nears proximity of the any of the hotspots.

8. The method as recited in claim 7, further comprising: causing the display device to play an audible sound so that the user receives both a visual and audio queue when one of the hotspots is being approached.

9. The method as recited in claim 3, wherein at least one of the hotspots is associated with a link to other elements in the interactive map, the elements include a node, another hotspot, or a location within a branch.

10. The method as recited in claim 1, further comprising:
receiving a query from the user;
performing a search pertaining to the query; and
displaying a collection of results including respective nodes, branches, events, or hotspots, each of the nodes, branches, events and hotspots is clickable.

11. The method as recited in claim 1, further comprising: allowing the user to navigate through the interactive map by entering a command via an input device.

12. The method as recited in claim 3, wherein the command is a query, and the method further comprising:
receiving the query from the user; and
highlighting one of nodes, one of branches, or one of the hotspots in the interactive map that represents an answer to the query.

13. The method as recited in claim 1, wherein the interactive map is displayed in a first view, and the visual effect about the hotspot is displayed in a second view.

14. The method as recited in claim 5, wherein the second view is a pop-up view when the hotspot is selected by the user.

15. The method as recited in claim 1, further comprising:
detecting a first point selected by the user in the interactive map;
jumping to a second point in the map from the first point when the second point is selected by the user; and
displaying a visual representation of how the second point is reached from the first point in the interactive map.

16. The method as recited in claim 15, wherein said displaying a visual representation of how the second point is reached from the first point in the interactive map comprises:
showing a navigational route progressively from the first point to the second point; and
displaying any of the hotspots that are embedded along the navigational route so that the user can select any of the embedded hotspots retroactively.

17. A server for providing a virtual tour of a shopping mall via an interactive map, the server comprising:
a processor;
a memory space, coupled to the processor, for storing at least a database to be accessed and code to be executed by the processor to cause the server to perform operations of:
causing a display device to display a portion of the interactive map generated from a logic process based on the database, wherein the portion of the interactive map represents a part of the shopping mall and includes one or more nodes, one or more branches, and one or more of hotspots, each of the hotspots represents a point of interest with details about the point of interest;
causing the display device to display a sequence of images of a selected route to demonstrate how a user would see when going along the selected route in the shopping mall;
accessing auxiliary data associated with the hotspot when the user selects the hotspot, wherein the auxiliary data is not part of the interactive map being displayed but is obtained from an external source; and
displaying from the auxiliary data an visual effect about the each of the hotspots so that the user understands more about the hotspot.

18. The server as recited in claim 17, wherein the auxiliary data pertains to an event that takes place in the shopping mall, the event pops out automatically when the sequence of images approaches a hotspot within a predefined time.

19. The server as recited in claim 18, wherein the operations further comprise:
accepting an input of a destination from the user;
highlighting a path to the destination in the interactive map; and
causing to display any of the hotspots along the path in the interactive map as the image sequence nears proximity of the any of the hotspots.

20. The server as recited in claim 18, wherein the operations further comprise:
causing the display device to display a video sequence to show how the user would see when going to the destination along the path;
pausing automatically the video sequence when the video sequence approaches an upcoming intersection;
causing the display device to display choices available at the upcoming intersection; and
causing the display device to continue displaying a video sequence to proceed with a selected path according to the one of the choices made by the user.

* * * * *